(12) United States Patent
Rihn et al.

(10) Patent No.: US 10,775,892 B2
(45) Date of Patent: Sep. 15, 2020

(54) SYSTEMS AND METHODS FOR MULTI-USER SHARED VIRTUAL AND AUGMENTED REALITY-BASED HAPTICS

(71) Applicant: Immersion Corporation, San Jose, CA (US)

(72) Inventors: William S. Rihn, San Jose, CA (US); David M. Birnbaum, Oakland, CA (US); Shadi Asfour, San Jose, CA (US); Satoshi Araki, Redwood City, CA (US); Sanya Attari, Fremont, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/959,018

(22) Filed: Apr. 20, 2018

(65) Prior Publication Data
US 2019/0324541 A1    Oct. 24, 2019

(51) Int. Cl.
*G06F 3/01*       (2006.01)
*G06T 19/00*      (2011.01)
*G06F 3/0481*     (2013.01)
*A63F 13/285*     (2014.01)

(52) U.S. Cl.
CPC ............ *G06F 3/016* (2013.01); *A63F 13/285* (2014.09); *G06F 3/011* (2013.01); *G06F 3/04815* (2013.01); *G06T 19/006* (2013.01)

(58) Field of Classification Search
CPC ...... G06F 3/011; G06F 3/014; G06F 3/04815; G06T 19/006
See application file for complete search history.

(56) References Cited

U.S. PATENT DOCUMENTS

| | | | | |
|---|---|---|---|---|
| 2010/0131904 A1* | 5/2010 | Fong | ..................... | G06F 3/0346 715/863 |
| 2011/0291945 A1* | 12/2011 | Ewing, Jr. | ............. | G06F 1/1686 345/173 |
| 2012/0038549 A1* | 2/2012 | Mandella | ................ | G06F 3/011 345/156 |
| 2012/0081359 A1* | 4/2012 | Lee | ..................... | G06F 3/04815 345/419 |
| 2014/0201666 A1* | 7/2014 | Bedikian | ................. | G06F 3/017 715/771 |
| 2015/0067601 A1* | 3/2015 | Bernstein | .............. | G06F 3/0488 715/823 |
| 2016/0004300 A1* | 1/2016 | Baic | ........................ | G06F 3/011 345/419 |

(Continued)

OTHER PUBLICATIONS

EP19170664.7, "Partial European Search Report", dated Sep. 23, 2019, 13 pages.

(Continued)

*Primary Examiner* — Jeffery A Brier
(74) *Attorney, Agent, or Firm* — Kilpatrick Townsend & Stockton LLP

(57) ABSTRACT

Systems and methods for multi-user shared virtual and augmented reality-based haptics are disclosed. One illustrative method for multi-user shared virtual and augmented reality-based haptics includes determining a position of an object; determining a viewpoint of at least one observer with respect to the object; determining a haptic effect to be output based at least in part on the position and the viewpoint; and outputting the haptic effect.

23 Claims, 41 Drawing Sheets

(56) References Cited

U.S. PATENT DOCUMENTS

| | | | |
|---|---|---|---|
| 2016/0098095 A1* | 4/2016 | Gonzalez-Banos | G06F 3/017 345/156 |
| 2016/0187974 A1 | 6/2016 | Mallinson | |
| 2016/0189405 A1* | 6/2016 | Lyons | G06T 11/001 345/592 |
| 2016/0202760 A1 | 7/2016 | Churikov et al. | |
| 2017/0076503 A1 | 3/2017 | Tamaoki et al. | |
| 2017/0173457 A1 | 6/2017 | Rihn | |
| 2017/0336882 A1 | 11/2017 | Tome et al. | |
| 2018/0060606 A1 | 3/2018 | Dascola et al. | |
| 2018/0101239 A1 | 4/2018 | Yin et al. | |
| 2018/0107276 A1* | 4/2018 | Heubel | G06F 3/04883 |

OTHER PUBLICATIONS

Bowman et al., "Design and Evaluation of Menu Systems for Immersive Virtual Environments", Proceedings IEEE Virtual Reality, 2001, 8 pages.

Dachselt et al., "A Survey and Taxonomy of 3D Menu Techniques", JVRC12: Joint Virtual Reality Conference of ICAT-EGVE-EuroVR, Eurographics Symposium on Virtual Environments, May 8, 2006, pp. 89-99.

EP19170664.7 , "Extended European Search Report", Jan. 16, 2020, 17 pages.

* cited by examiner

VEHICLE ON ROAD IN LANDSCAPE

Fig. 8 — Placing "paint" on tablet

Placing "paint" on tablet

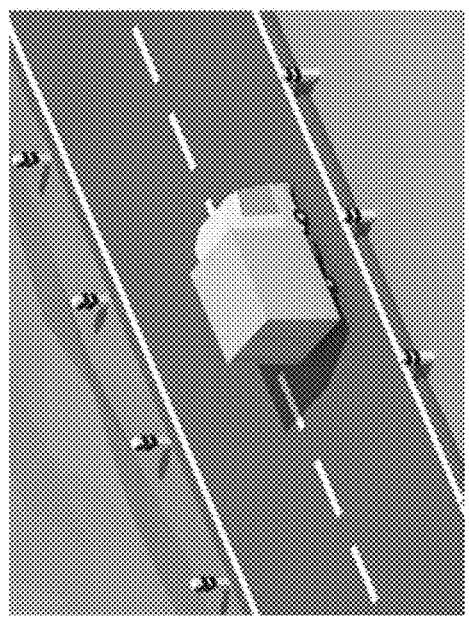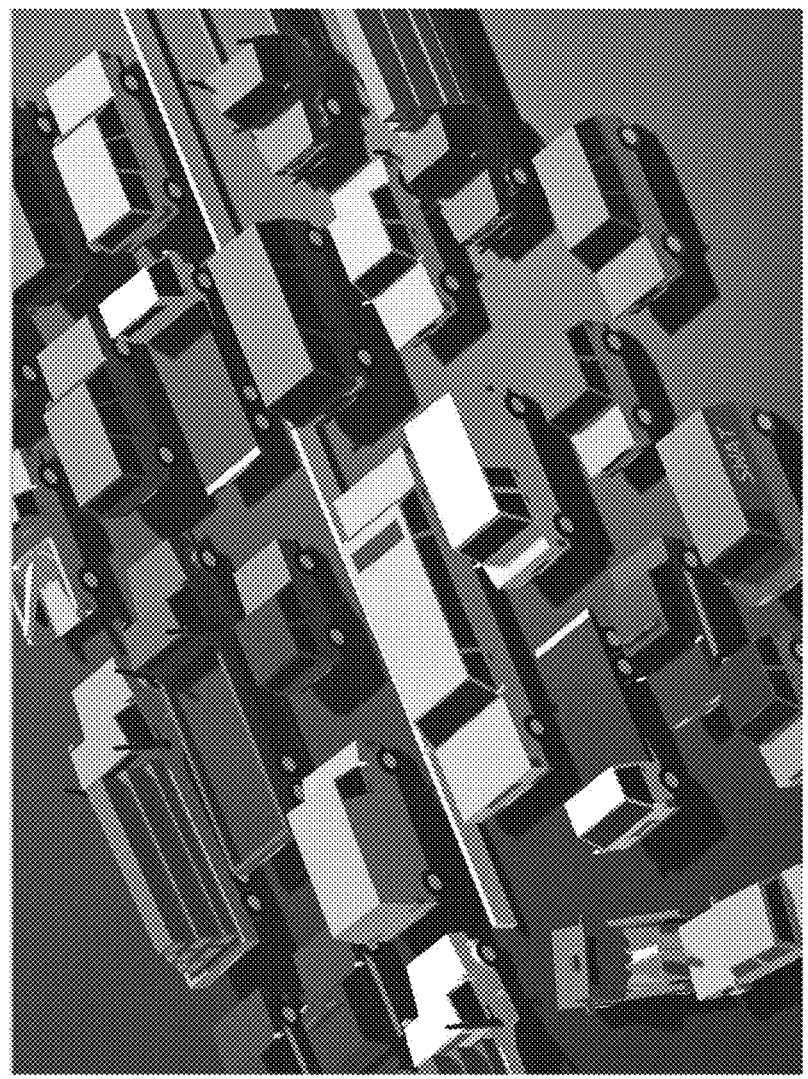
Fig. 32

SYSTEMS AND METHODS FOR MULTI-USER SHARED VIRTUAL AND AUGMENTED REALITY-BASED HAPTICS

FIELD OF THE INVENTION

The present application relates to the field of virtual and augmented reality applications and devices. More specifically, the present application relates to multi-user shared virtual and augmented reality-based haptics.

BACKGROUND

Virtual and augmented reality systems are becoming more prevalent. Such system allow a user to interact with virtual objects within a virtual environment. Some such systems allow a third party to view what the user is experiencing in the virtual environment. But interaction between uses can be limited. Systems and methods for allowing a shared experience in a virtual or augmented reality environment are needed.

SUMMARY

In one embodiment, a method for multi-user shared virtual and augmented reality-based haptics comprises determining a position of an object; determining a viewpoint of at least one observer with respect to the object; determining a haptic effect to be output based at least in part on the position and the viewpoint; and outputting the haptic effect. In another embodiment, a computer readable medium may comprise program code, which when executed by a processor is configured to enable the above described method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIGS. 25-32 illustrate various embodiments for interacting with a virtual environment with a "magic window" application.

DETAILED DESCRIPTION

Figure 1:
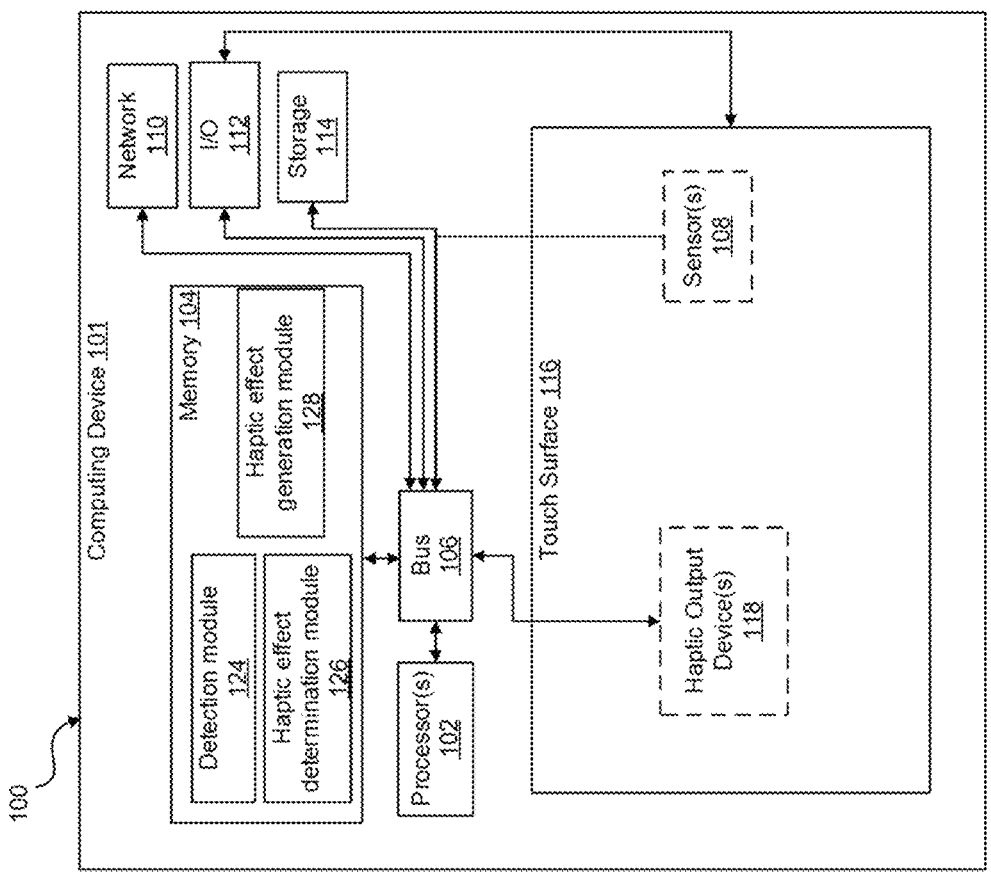
FIG. 1 shows an illustrative system for multi-user shared virtual and augmented reality-based haptics in one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example System for Multi-User Shared Virtual and Augmented Reality-Based Haptics In one illustrative embodiment, a mobile application executing on a digital pad or other mobile device enables a user to connect to and interact with virtual objects in a virtual or augmented reality environment. The user may also create objects, or the objects may be created via different users, including, for example artists or other content creators. Any of the users may create, observe, or interact with the objects using a mobile pad, a head-mounted display ("HMD"), or any other device. Both the HMD and mobile devices may include embedded haptic actuators. For example, in one embodiment, an artist in an Augmented Reality (AR) environment interacts with a 3D world, creating virtual objects and possibly interacting with physical objects. The general idea is to enable observers who are not wearing the headset to participate in the AR experience either through observing ("magic window") or collaborating.

The user of the pad can experience haptics based on the user's perspective relative to the virtual or augmented environment. For example, the user of the pad may experience the environment from the perspective of an observer or through the perspective of an avatar interacting with the environment. The user of the pad experiences haptic effects based on the environment, which may vary, the user's perspective, which may also vary, and interactions between the user and the environment. The user may be one of a number of users all experiencing and interacting with the same virtual or augmented reality environment at once. And each user may have her own perspective or may share a perspective with another user.

The haptic effects may be based on an object that is treated as the haptic effect emitter. The emitter may be directional and may have a strength that diminishes as a user moves further away from the emitter in the virtual or augmented environment. Further the effect may be multidirectional based on the user's position with respect to the emitter. The emitter could be an object or a location.

Such a system allows multiple users to experience a common, virtual environment. And they can do so either in a collocated or non-collocated real world space. Each user may experience the environment using a different type of device. In some embodiments, a haptic designer can use such a system to create and transmit haptic effects to multiple users. And the effects can vary based on the relative position of the users within the virtual or augmented environment.

In one such system, users can experience the environment form the point of view of a content creator, either by creating content themselves or by experiencing the environment through the point of view of another user. The user can also experience the environment by participating in it. For example, an artist may create a road or a flight path. Then the user may experience the road from the point of view of a car traveling the road. In another example, a product designer might create a virtual product for other users to experience. The perspective and the environment both affect the types of experience, including the haptic effects, that are provided to the user.

In an augmented reality embodiment, the environment may be grounded to a tracking base or other grounding element, such as a QR code. And the experience may be collocated or, alternatively, be cloud based such that users need not be near one another to share the experience.

The preceding example is merely illustrative and not meant to limit the claimed invention in any way.

Illustrative Systems for Multi-User Shared Virtual and Augmented Reality-Based Haptics FIG. 1 shows an illustrative system 100 for multi-user shared virtual and augmented reality-based haptics. The device shown in FIG. 1 may be used by a user experiencing a shared environment with an artist or by the artist. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, touch screen displays, keyboards, mice, speakers, microphones, cameras, and/or other hardware used to input data or output data. Storage 114 represents nonvolatile storage such as magnetic, optical, or other storage media included in device 101.

System 100 further includes a touch surface 116, which, in this example, is integrated into device 101. Touch surface 116 represents any surface that is configured to sense touch input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position.

In some embodiments, sensor 108, touch surface 116, and I/O components 112 may be integrated into a single component such as a touch screen display. For example, in some embodiments, touch surface 116 and sensor 108 may comprise a touch screen mounted overtop of a display configured to receive a display signal and output an image to the user. The user may then use the display to both view the movie or other video and interact with the haptic generation design application.

In other embodiments, the sensor 108 may comprise an LED detector. For example, in one embodiment, touch surface 116 may comprise an LED finger detector mounted on the side of a display. In some embodiments, the processor 102 is in communication with a single sensor 108, in other embodiments, the processor 102 is in communication with a plurality of sensors 108, for example, a first touch screen and a second touch screen. The sensor 108 is configured to detect user interaction and, based on the user interaction, transmit signals to processor 102. In some embodiments, sensor 108 may be configured to detect multiple aspects of the user interaction. For example, sensor 108 may detect the speed and pressure of a user interaction and incorporate this information into the interface signal.

Device 101 further comprises a haptic output device 118. In the example shown in FIG. 1A haptic output device 118 is in communication with processor 102 and is coupled to touch surface 116. The embodiment shown in FIG. 1A comprises a single haptic output device 118. In other embodiments, computing device 101 may comprise a plurality of haptic output devices. The haptic output device may allow a user or artist to experience effects as they are generated in relation to the virtual or augmented reality environment or create haptic effects to be incorporated into the overall experience.

Although a single haptic output device 118 is shown here, embodiments may use multiple haptic output devices of the same or different type to output haptic effects. For example, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an LRA. Additional actuators may be incorporated into devices in communication with computing device 101. For example, a head-mounted display may incorporate actuators that allow it to provide haptic effects to an artist or any other user interacting with the environment.

Turning to memory 104, exemplary program components 124, 126, and 128 are depicted to illustrate how a device may be configured to determine and output haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding audio and video characteristics to select a haptic effect to generate. Particularly, module 126 comprises code that determines, based on the audio or video properties, an effect to generate and output by the haptic output device. Module 126 may further comprise code that selects one or more existing haptic effects to provide in order to assign to a particular combination of properties, such as perspective, distance, and properties of the environment. For example, a user experiencing an environment as a participant riding along a gravel road, may experience a coarse, relatively high magnitude haptic effect. Different haptic effects may be selected based on various combination of these features. The haptic effects may be provided via touch surface 116 and may be provided to an artist or other haptic designer in order that the designer can preview a particular effect or set of effects and modify them as necessary to better model the scene.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, a desired haptic effect may be indicated along with target coordinates for the texture and an appropriate waveform sent to one or more actuators to generate appropriate displacement of the surface (and/or other device components) to provide the haptic effect. Some embodiments may utilize multiple haptic output devices in concert to simulate a feature. For instance, a variation in texture may be used to simulate crossing a boundary between buttons on an interface while a vibrotactile effect simulates the response when the button is pressed.

Figure 2:
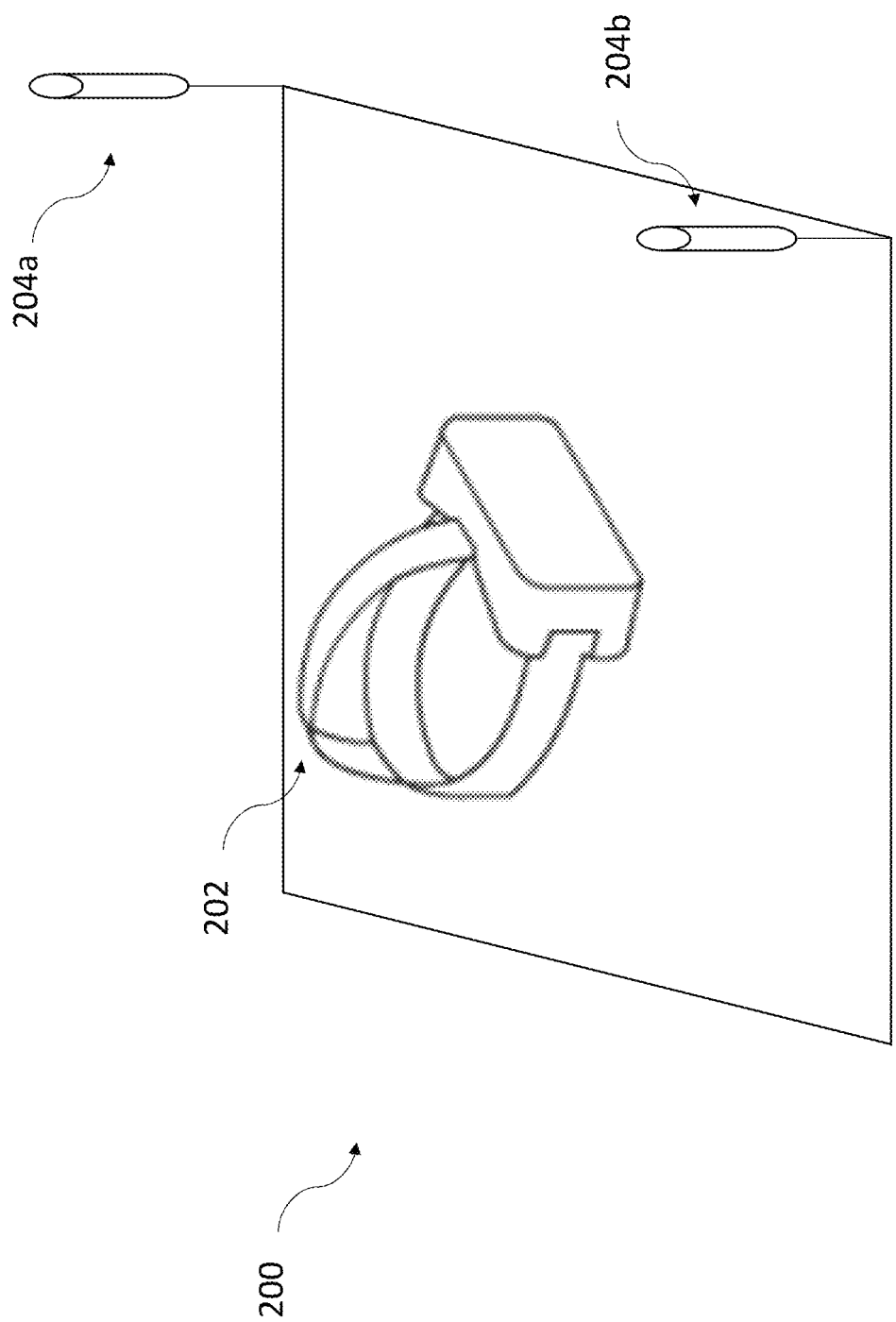
FIG. 2 shows another illustrative exemplary virtual or augmented reality system in one embodiment.

FIG. 2 is a diagram illustrating an exemplary virtual or augmented reality system 200. In the environment shown, and HMD 202 allows a user to experience the environment in an immersive manner. The HMD 202 includes displays that allow a user to see the environment. The HMD 202 may also include speakers, such as earphones that allow a user to hear sounds associated with the environment. The HMD 202 may also include haptic actuators so that a user can feel sensations associated with the environment.

The system 200 also includes one or more detectors 204a, 204b. The detectors 204 sense movement of the HMD 202 in the environment and provide that information to a processor (not shown) located in, near, or remote from the system 200. The environment may include other devices. For example, the user may be wearing or holding various devices that allow the system to detect movement of various parts of the user's body. For example, the user may pick up a controller to use as a paint brush. The sensors 204 can detect the user's gestures with the device and provide signals to the processor reflecting the movement. Any type of motion tracking system could be utilized including, for example, infrared, electromagnetic, RGB Camera-based, or others.

Examples of Multi-User Shared Virtual and Augmented Reality-Based Haptics

Embodiments of multi-user shared virtual and augmented reality-based haptic systems may receive a variety of inputs. For example, one or more users, such as an artist, observer, content creator, or designer may interact with the VR or AR environment. In one such embodiment, sensor data indicating, for example hand position or interaction with a virtual palette or VR or AR objects may be used to determine how the environment and the perspective of the user is changing. Such information may include, for example, proximity to virtual or physical object that serves as a haptic emitter. Other information that reflects the spatial relationship between a user and emitter may be utilized as well.

In one embodiment, in which a user acts as an artist, a system receives data regarding various brushes and brushstrokes that available for the artist to use to create or augments objects in the environment. The data may include information about changes to the size of a brushstroke or about the "paint" that is used within the environment. The brushstrokes might create simple visual effects. Alternatively, the brushstrokes may be used to create virtual objects with which the artist or another user, such as a third party observer, can interact. For instance, an artist might draw or paint a virtual road for an automobile or a virtual flight path for a plane, insect, or bird. The artist or user might then add an automobile or airplane to the environment. The vehicle can then follow the road or flightpath through the virtual environment. The users' and the vehicle's interaction with the environment may result in the creation and outputting of various haptic effects.

Various other embodiments and features are possible. For example, the artist may render a boat in water or a horse on a trail. The artist could also create hiking trails that can be traversed or viewed. Properties of the various features can then be used to vary haptic effects output to a user of the system. For example, the trail or road could be built using asphalt, sand, or gravel. Haptics output to a user of the system could vary based on the type of material used to build the road. And the environment could be changed by any of the uses, resulting in a collaboratively-built environment.

Such an environment could be crated in any number of ways. A user, including a content creator, can position themselves within the environment and vary their position. Further, the objects that the user creates can be moved and modified. For example, a first user could create a road. Then a second user could create or spawn a car to traverse the road and thereby change the environment. A third user could then control the car, starting, stopping, and varying the speed of the car. Such objects could exist virtually or in combination with a real object or in some combination of both. For example, a real object might be augmented with a component overlaid on the real object. The augmented component can be any combination of modalities, such as a visual object with haptics or could be haptic effects alone. In other words, a physical object could have haptics overlaid upon it even if the visual aspects of the object were not changed.

The experience of a user could vary based on their position relative to other users or to objects in the environment capable of emitting haptic effects. For example, the distance between the user and an object in the environment could affect the haptic effects the user experienced. The relative position of the user and the object may be variable since the user and the virtual object may both be moving and thus may be moving relative to one another. In one embodiment, the haptic effect experienced by the user may depend on the velocity with which the two users and an object are approaching or departing from one another.

The user may interact with objects, virtual, real, or some combination, or with the environment itself. For instance, the user may add an object to the environment and then interact directly or indirectly with that object. For example, if the user adds (spawns) a car on a road drawn by that user or another user. The user can then provide input to control the car, including, for example starting, stopping, and changing speed. All of these interactions can cause haptic effects to be output or to change. In another example, the user may cause a palette to be displayed, and use the palette to add visual elements to the environment. The user could also change the environment more generally, such as by changing the lighting (day or night), or adding some other sort of environmental effect to the environment (clouds, wind, rain, etc.). Observers can affect the environment in various different ways as they interact with it.

In some embodiments, the viewpoint of a user with respect to objects within the environment can affect the user's experience, such as by varying the haptic effects output to the user. If multiple users are simultaneously experiencing the environment, then each user may experience a different set of effects. For instance, a user may experience the environment from a first person perspective. For instance, a first user and a second user may experience the environment based on their location relative to one another, such as when a third party observer views an artist rendering objects in a virtual environment. This perspective can change as the two users move relative to one another. In another example, a product designer could create a product in the environment, while another user moves around the product experiencing various aspects of the product and potentially making changes to the product as it is designed. All of these interactions may trigger distinct haptic effects.

In some embodiments, a user may experience the environment as a third-party observer or from the perspective another user, such as an artist creating content in the environment. In other embodiments, the user may experience the environment from the perspective of a participant in the environment, such as for example, sitting in a car traversing a road or in an airplane traversing a flight path.

The viewpoint of such a user may vary as the user, the person from whose viewpoint the user is experiencing the environment, or the object moves within the environment. In some environments, the user is not "inside" the environment. For instance, a content creator creates a virtual car with haptics as an advertisement. A user could experience the car in AR or VR using an HMD, or alternatively, they could also see a two-dimensional view of the car on a website, where the proximity of the cursor to the haptic emitter (the car) comprises the virtual spatial proximity for creation of haptic effects.

The user's experience may also be affected by the user's viewpoint with respect to the object from which the haptic effect is emitted. For example, the haptic effect could result from a direct interaction with an object. For instance, an artist could mix paint within the environment. The artist's interaction with the paint might trigger a haptic effect. In another example, a user interacts as a third-party observer with respect to where the haptics are being emitted. For instance, a bullet approaching the user might trigger a particular haptic effect. As another example, wind occurring in the environment would have different effect depending upon where the user is located in relation to the wind and would cause the user to experience different haptic effects.

In yet another example, a user might pass through a tunnel in the environment, which would affect the effects provided to the user.

In some embodiments of the invention, the user may not see visual objects in the environment but still be able to experience other aspects of the environment, such as the haptic effects. For example, a user may be "inside" environment but unable to see one or more objects present in the environment. For instance, the environment could be dark. As the user interacts with the environment, such as by touching or waling over objects, haptics can be provided to the user. In some embodiments, the position of various users with respect to one another, either in the VR or AR environment or in the physical world, can affect the haptic effects provided to the user.

Embodiments of the invention can provide a variety of haptic effects. The haptic effects may be determined and generated based on any of the variables above, such as position or viewpoint. The haptic effect or parameters of a haptic effect may be calculated or synthesized using a physics models. For instance, a haptic effect may be calculated based on an incline that a vehicle is traversing or a barrier through which a vehicle is passing.

A variety of types of haptic effects may be utilized, including for example friction, vibration, and air, and kinesthetic force. The haptics can be used to indicate contact, air movement, water, and other conditions or objects present in the virtual or augmented environment. Examples of such haptic effects include a haptic effect based on a texture of the road created by the artist. Another example is a haptic effect based on a velocity of a car as the car drives around a road. The haptic effect may be based on a user's interaction with the environment generally, such as by moving through the environment without touching a specific object. In some embodiments, the haptic effect may be directional and increase or decrease in proportion with distance from the emitter. For example, the haptic effect may push or pull the user.

In some embodiments, various properties of a haptic effect may vary, including frequency or pitch, magnitude, amplitude, directionality of a haptic source, or directionality of actuator. In some embodiments, multiple effects may be combined. Also, a haptic effect may vary based on the type of device used to output the haptic effect. As one example, a user may add an oil slick or spot to a rough road within the environment and thereby cause a haptic effect associated with the road to change from a haptic effect associated with a rough texture to one associated with a smooth texture, e.g., a course, strong effect may become more finely grained and weaker and thus signal that the road is slippery.

In another example embodiment, an artist is using a particular vibrant color to create an object in an environment and a strong haptic effect is output when the artist or another user interacts with the object. The artist can then change a property of the object (e.g., change the color to something less vibrant), and the haptic effect associated with the virtual object changes, becoming less strong. In other embodiments, the haptic effect changes depending on the type of tool the user uses to create or modify objects in the environment.

In some embodiments, the haptic effects change as the viewpoint of the user changes. For example, stronger haptics or additional haptics may be output when the user switches from a first person mode to a third person mode. In another embodiments, the haptics may change based on position. For example, if the user is in the center of the environment, the effects can be scaled based on proximity to this position. In another example, a user's viewpoint is from the center of a road, and so haptics associated with cars driving around the road can be increased to create sensation of being positioned at the center (e.g., a center of a race track).

In some embodiments, the haptic effects vary based on the user moving their head to look around a three hundred and sixty degree environment. For example, a first haptic effect may be outline when a user is looking at an object in front of the user, and a second haptic effect can be output when the user turns around and looks at an object behind the user. Haptic effects may also be panned (e.g., from left to right) as the point of view of the user changes. In yet further embodiments, haptic effects vary based at least in part on changes in the physical location of the user within or around the environment.

For example, if the 3rd party observer and artist are collocated, as the 3rd party observer moves closer to, or away from, the artist, haptic effects can become stronger (or weaker).

Haptic effects can be changed based on the position of 3rd party observer relative to a virtual object. For example, in one embodiment, a first user creates a fire effect using a fire brushstroke, and a haptic effect associated with the fire brushstroke (e.g., a high frequency or high pitched haptic effect to indicate heat or fire, or a thermal haptic effect) is output. As a second user moves away from the fire, the frequency of the haptic effect can change indicating that the second user is becoming cooler, or the haptic temperature can become lower.

Haptic effects can also be changed based on the viewpoint of the haptic effect (e.g., position of the source or emitter of the haptic effect) and/or position of a user relative to the source of the haptic effect. For example, a pitch of a haptic effect associated with a second car approaching a first car in which a user is "riding" can change as the two cars move toward (or away from) each other. Another user may experience the same approach of the two cars from an observer viewpoint and experience a Doppler effect in the haptic effects as the cars approach or move away from the observer's position.

Depending on the capabilities of the system, certain haptic effects may be prioritized over other effects. For instance, in some cases a system may not be able to mix certain types of effects and so will play one of the effects instead. The system may reply on a priority measure to identify which haptic effect among a plurality of haptics is most important to be output. For example, if multiple haptic effects that have similar frequencies or strengths that can be provided to the observer, the priority system can determine which of the haptic effects is the most important. The haptic effect may also be adjusted end point where the effect is to be output. For instance, an effect may be stereo or mono or bidirectional or unidirectional depending on the capabilities of the haptic output device.

Haptic effects can be mixed together, based on the input parameters to a number of emitters. A single haptic effect can be synthesized that is substantially experienced by observers as equivalent to a concurrence of the multiple haptic sensations intended by the designers of the emitters. Haptic effects can be warped based on a medium that the haptic effect is traveling through.

In some embodiments, the system is able to determine a type of haptic effect based on a type of haptic output device. For example, if the user's device is not capable of controlling a frequency of a haptic effect, then the frequency of the haptic effect may not be changed. As another example, a user may be using a device that includes an advanced friction display. The user can touch the display, and a haptic effect that indicates a particular friction can be output. When another user observes the same environment through their device, including the first user's finger moving through the environment, the second user's device can output a haptic effect that includes high-definition vibrations rather than a change in friction.

In one embodiment, the haptic effects that are output may be based on properties of a real world object. For instance, the haptic effect could be based on the density of an object. Other such properties might include the shape, size, or certain user-defined properties.

Embodiments of the invention might comprise various types of architectures for creation of objects and other aspects of the environment, modifications to objects and the environment, and creation and modifications to the haptic effects experienced by users of the system. For example, FIG. 1 shows a mobile device with a touch screen. However, in other embodiments, the device may not include a touch screen. In some embodiments, a mobile device includes a sensor, such as a camera, that can be used for free-space gesture detection. In other embodiments, the user may utilize a ring, watch, wristband, smart clothing, headset, or other wearable to interact with the system and the environment. In some embodiments, actuators may be embedded in any of those devices. In addition, a variety of haptic output device may be utilized including ultrasonic, laser, and jet projecting devices.

Figure 3:
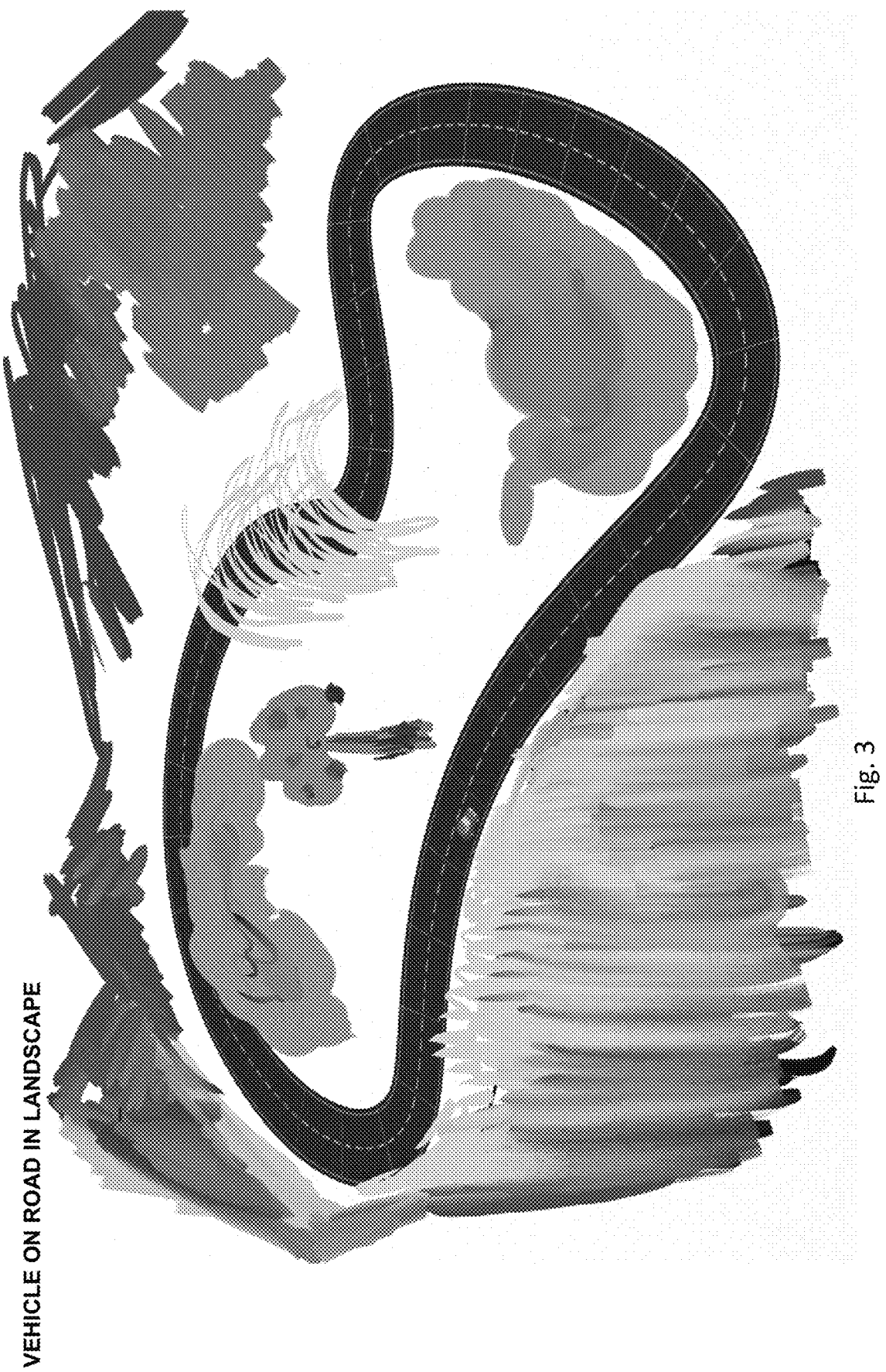
FIG. 3 is depicts an artist's rendering within a virtual or augmented reality environment in one embodiment.

FIG. 3 is depicts an artist's rendering within a virtual or augmented reality environment in one embodiment. In the rendering shown, the artist is able to use at least two brush styles for drawing or painting. The first brush is an oil-like paint brush that responds to size controls and color customization. Such a brush allows the artist to create a landscape around in which to draw a vehicle route. The second brush style is a road or route. In the embodiment shown, the second brush allows the artist to create a route for spawned game object (car), each with different haptic properties.

The resulting environment may allow users to view the environment from multiple perspectives, including as a content creator (e.g., artist), observer, or participant, for example. In one such embodiment, a first user uses a HMD to create content, while a second user uses a mobile pad device to observe the environment. The content creator is able to feel haptics from the act of mixing paint, painting, and putting down roads. The second user can use a mobile application window into the virtual or augmented environment to observe or to make changes, such as spawning and controlling a car.

Figure 4:
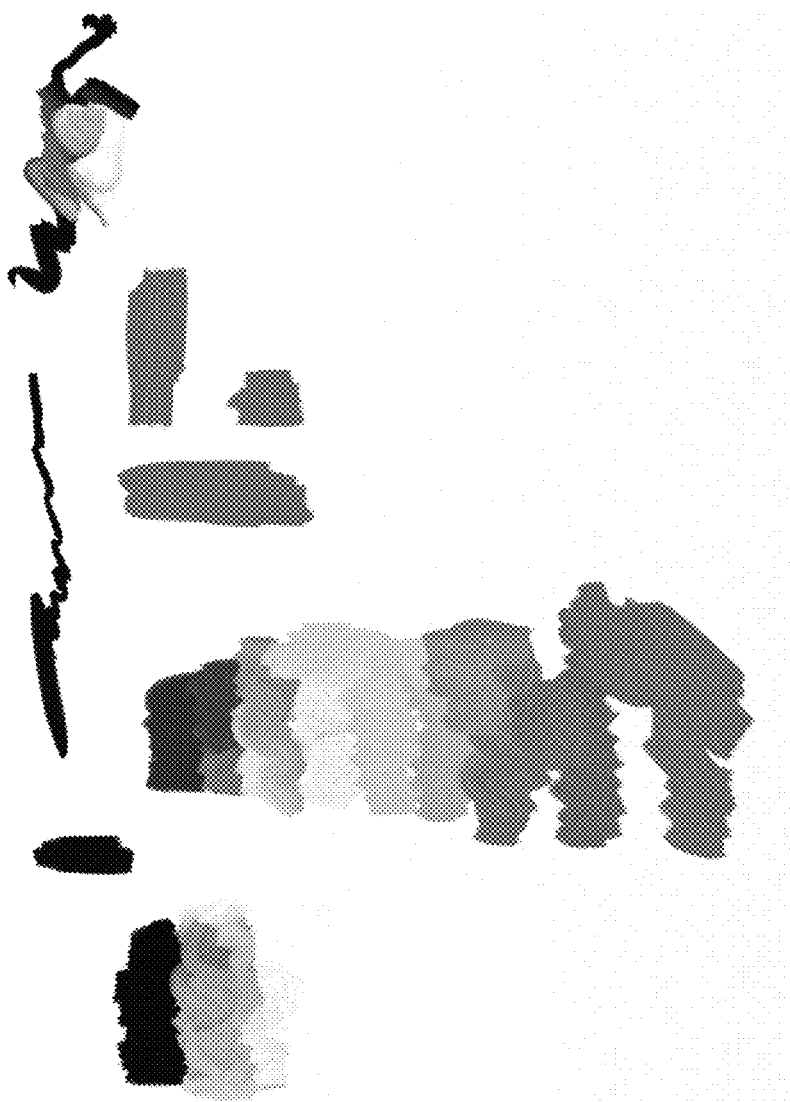
FIGS. 4 through 15 illustrate a process for mixing and applying colors to an environment in one embodiment.
Figure 5:
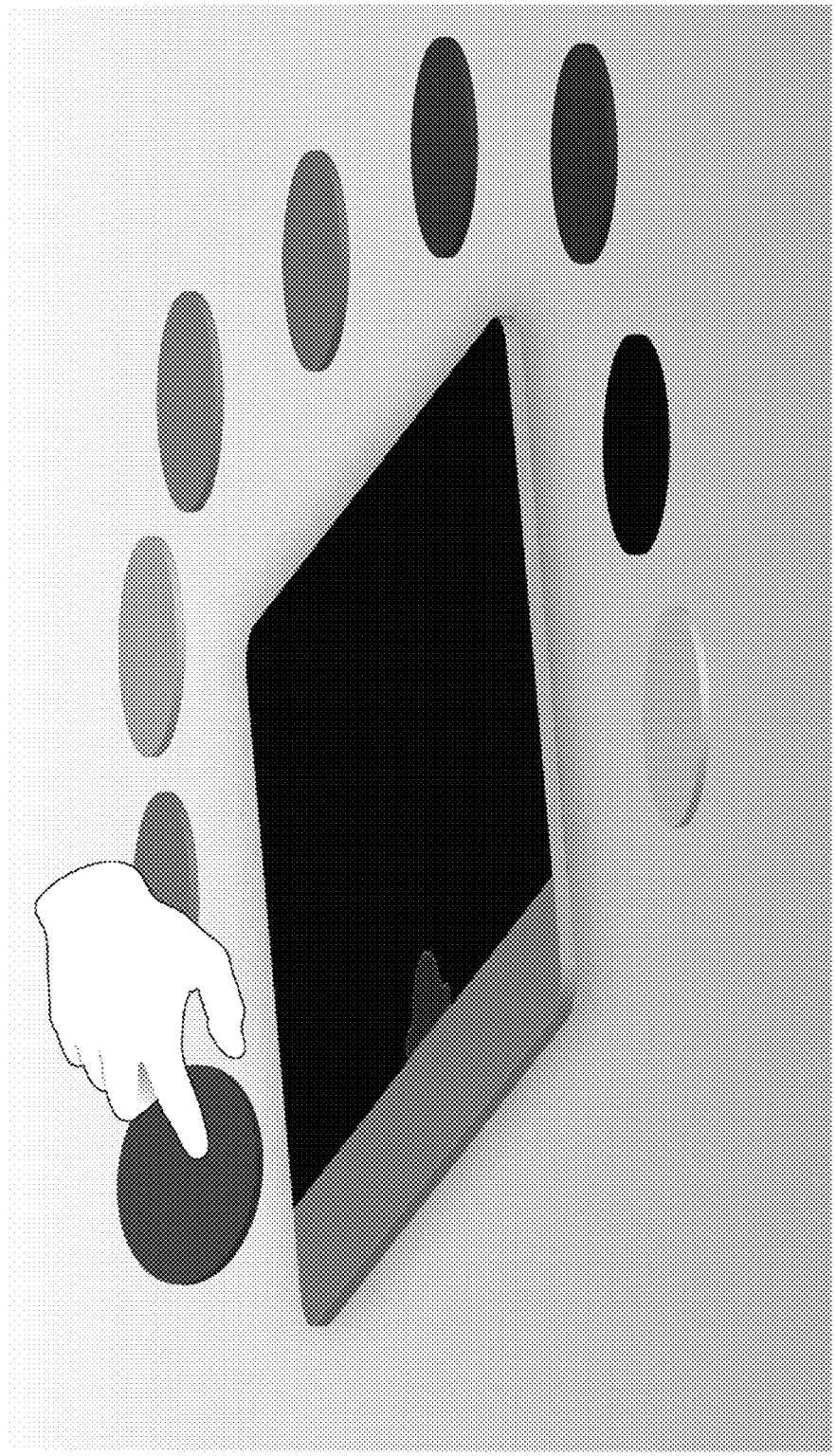
Figure 6:
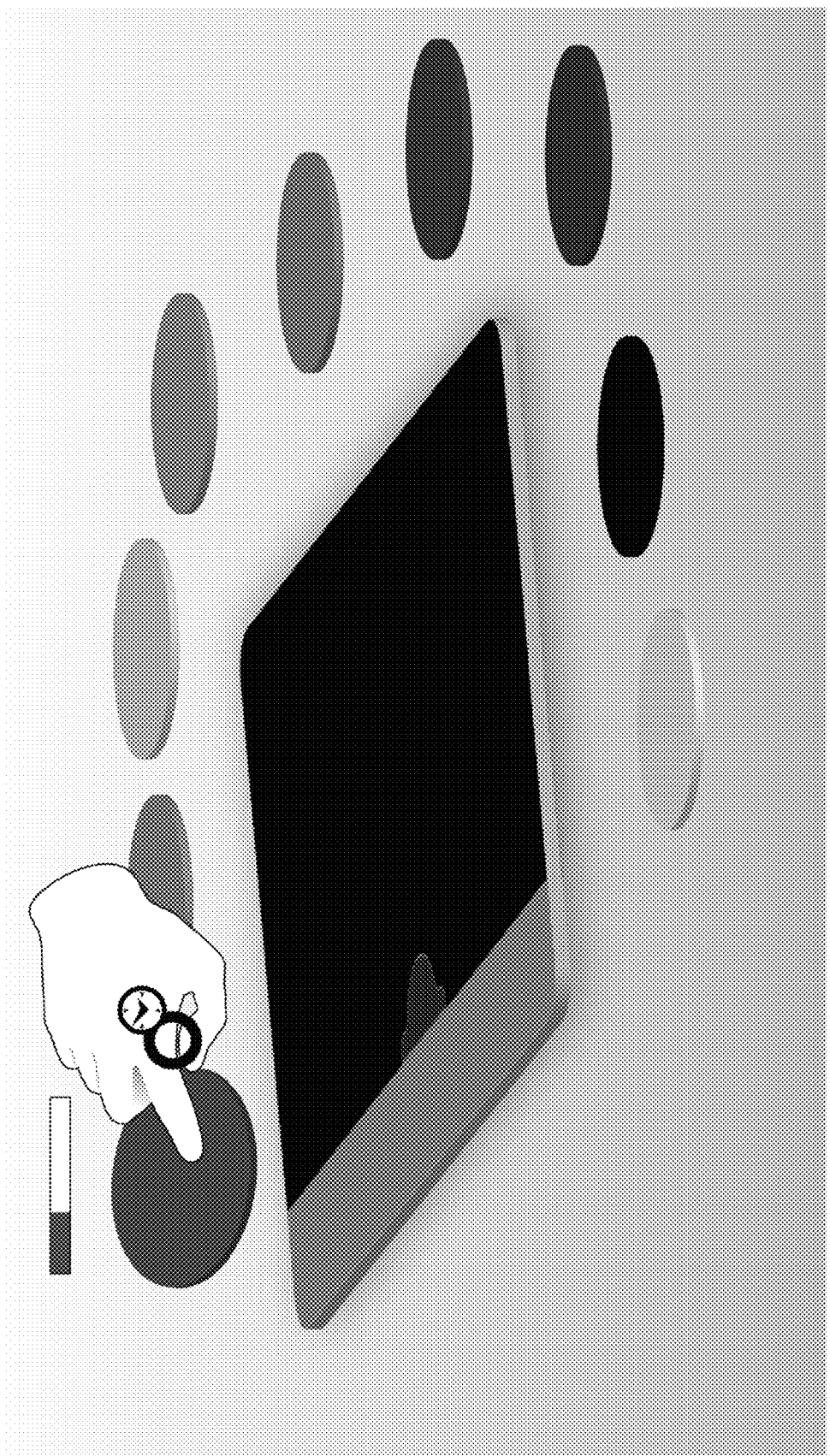
Figure 7:
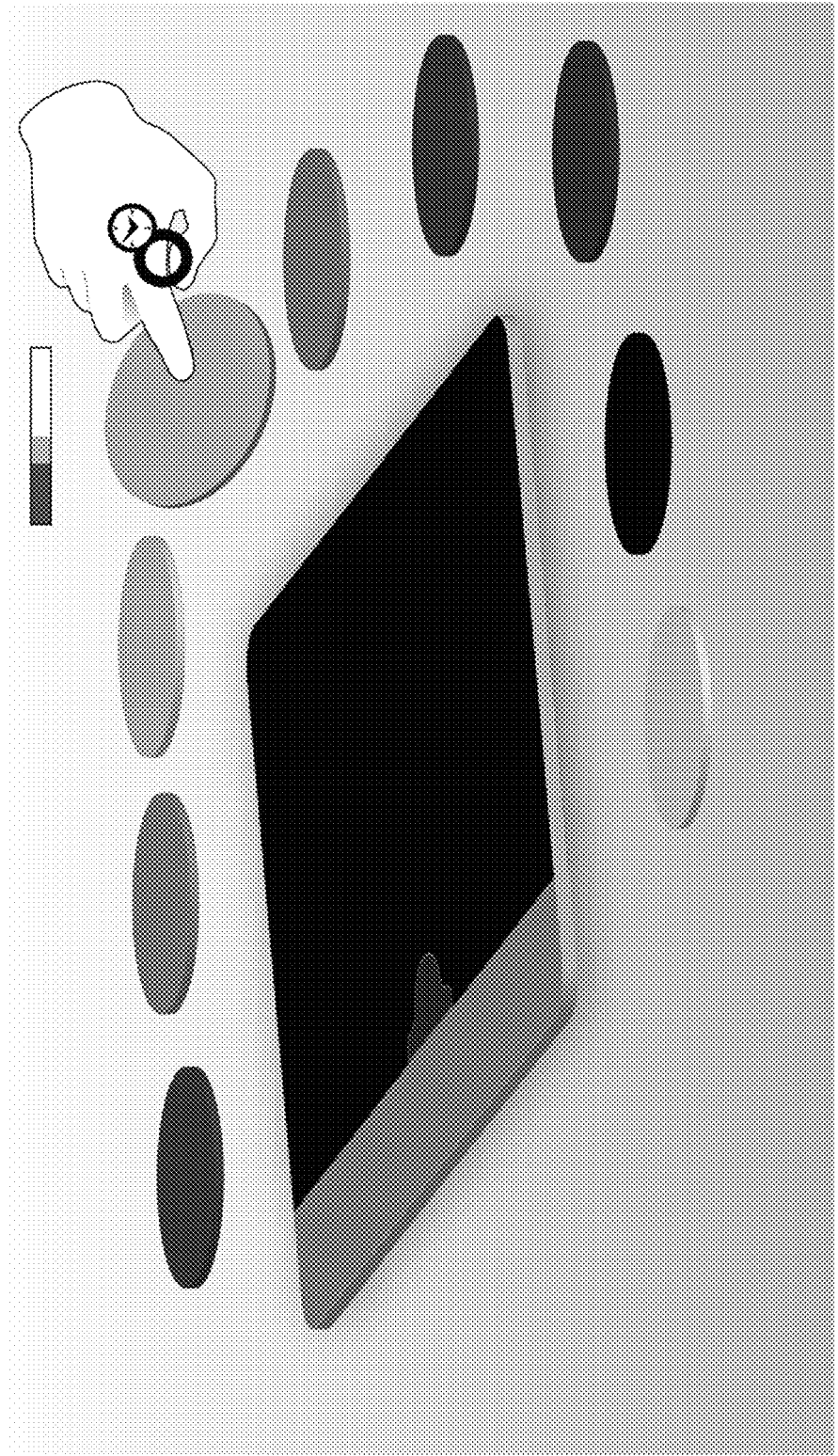
Figure 8:
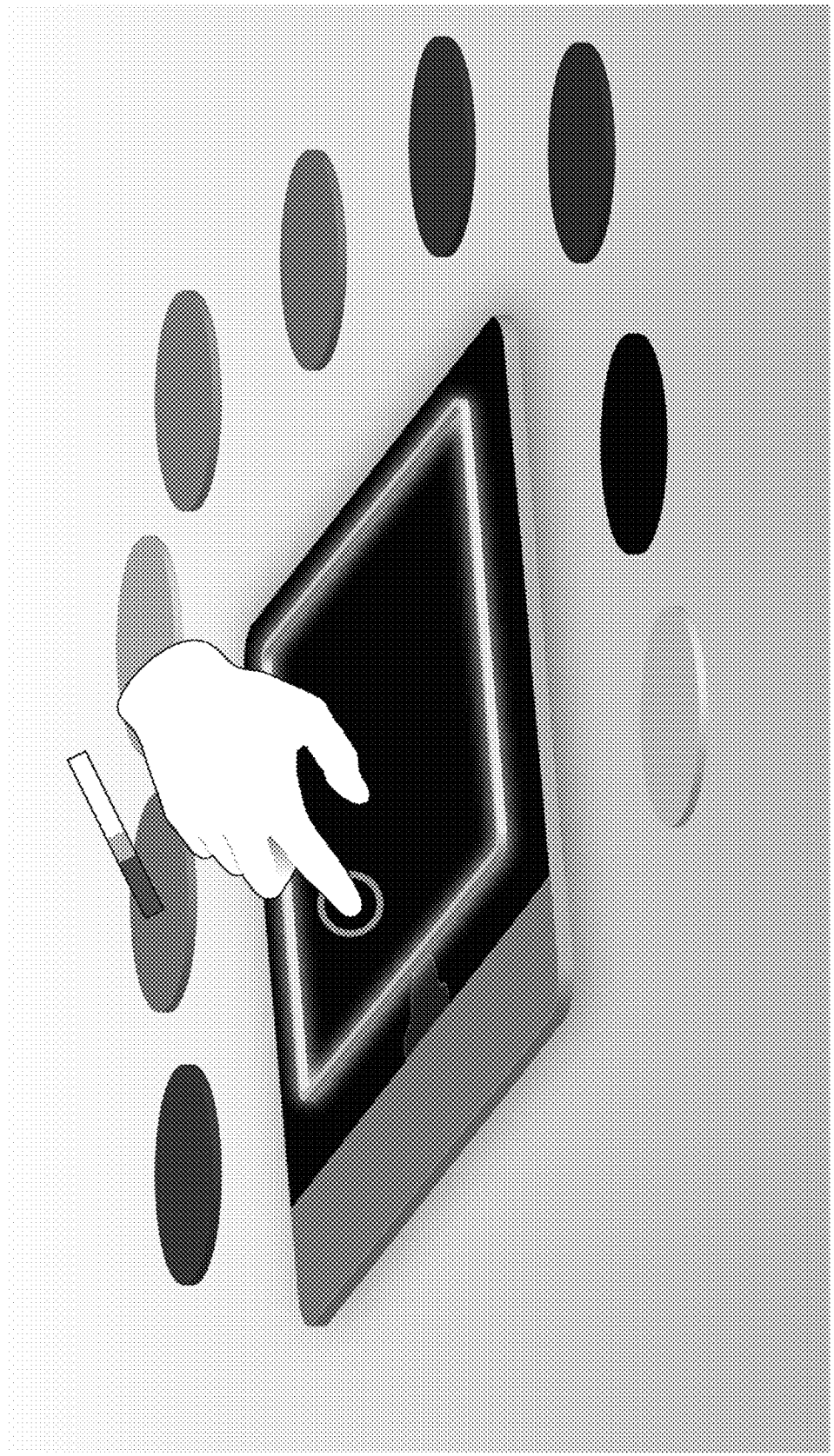
Figure 9:
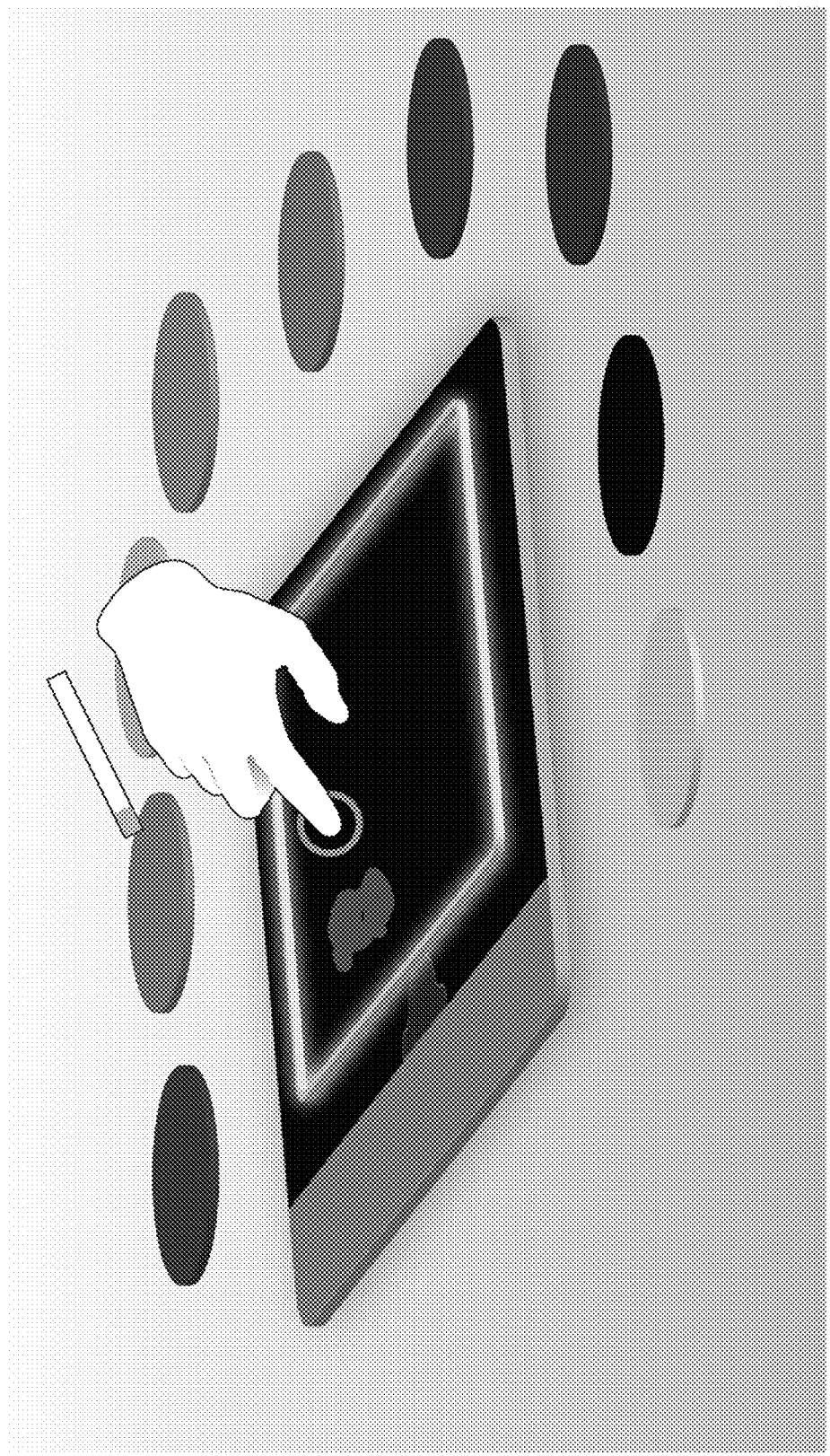
Figure 10:
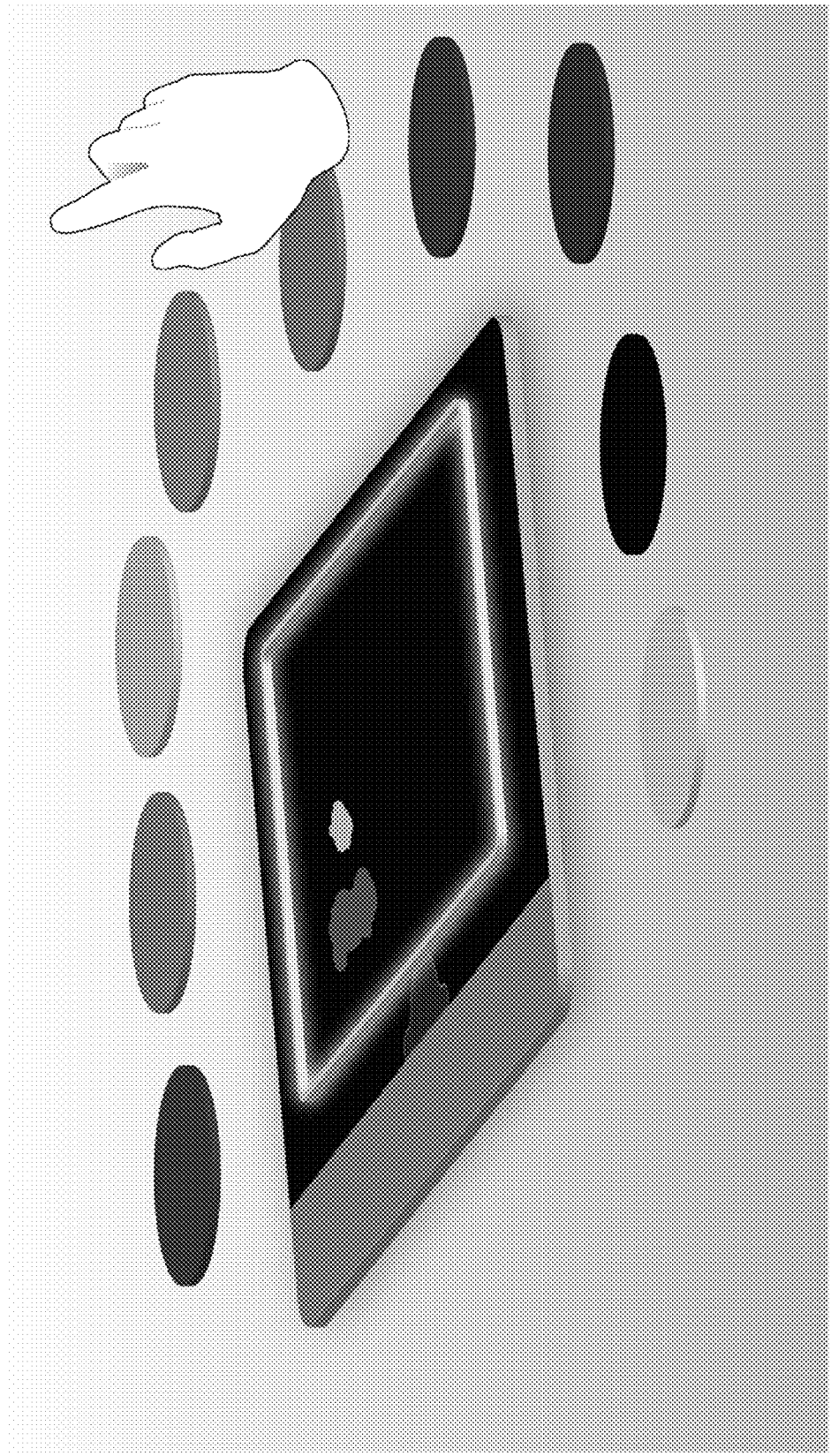

FIGS. 4 through 15 illustrate a process for mixing and applying colors to an environment in one embodiment. FIG. 4 illustrates the results of applying color to a blank canvas. FIG. 5 illustrates a user interface for selecting colors in a virtual or augmented reality environment. The mixing of colors is performed in the illustrated embodiment using an ink well metaphor. In such an embodiment, a user is able to select a color from one of the swatches by placing their tracked finger into the swatch's "AR leaf." The swatch animates to confirm that a selection has been detected. In one embodiment, when the user hold down a brush "button" (normally used to draw) to activate an ink-dropper like interaction, the finger will "fill up" the longer the button is held while the user holds their finger in the color swatch position (FIG. 6). The user is able to bring multiple colors into the finger without mixing (FIG. 7). Once the finger "contains" the color(s), the user can tap or apply pressure to the tablet surface to expel the color from the finger (FIG. 8). The color is then rendered on the tablet surface (FIGS. 9 and 10).

Figure 11:
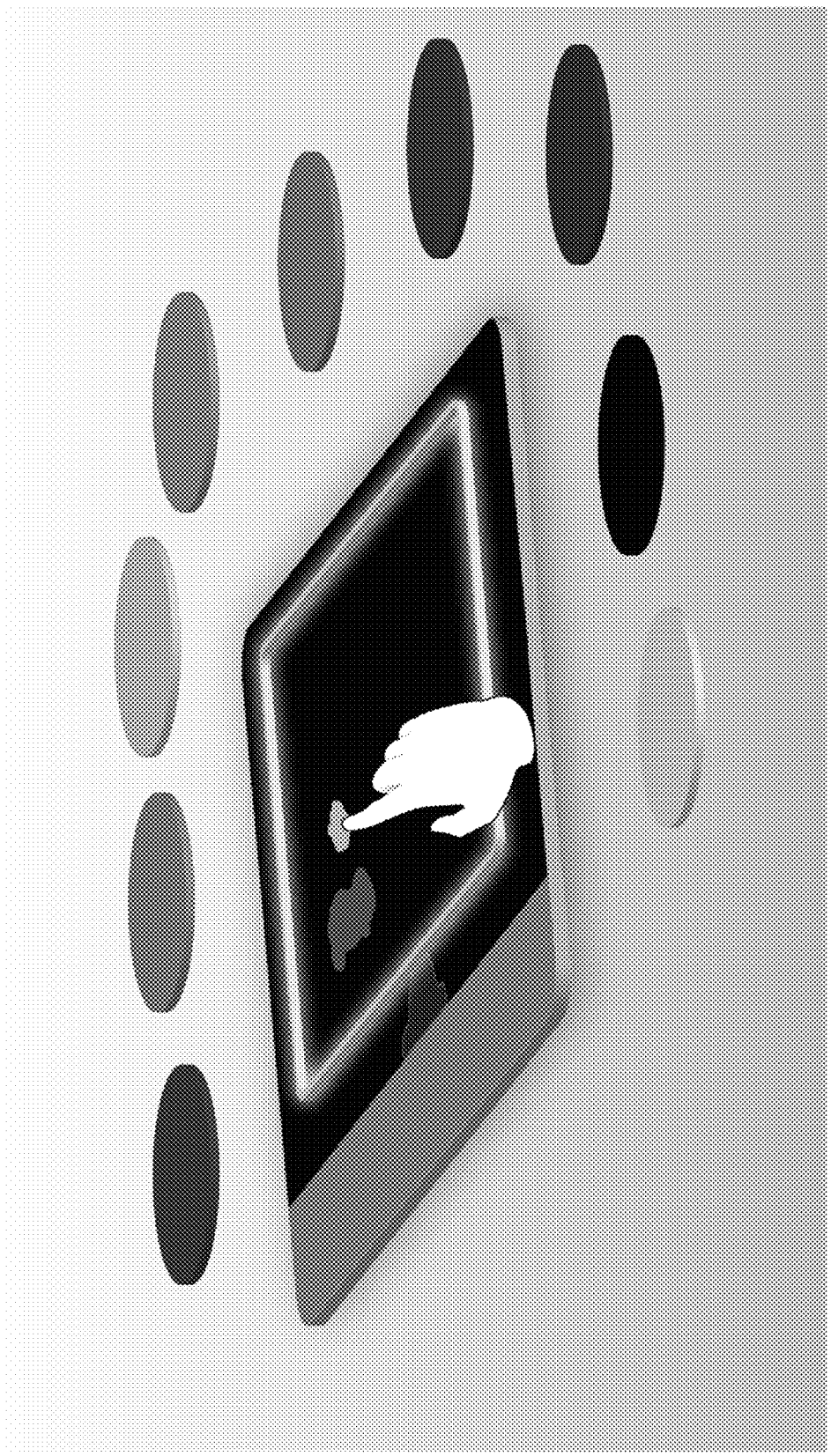
Figure 12:
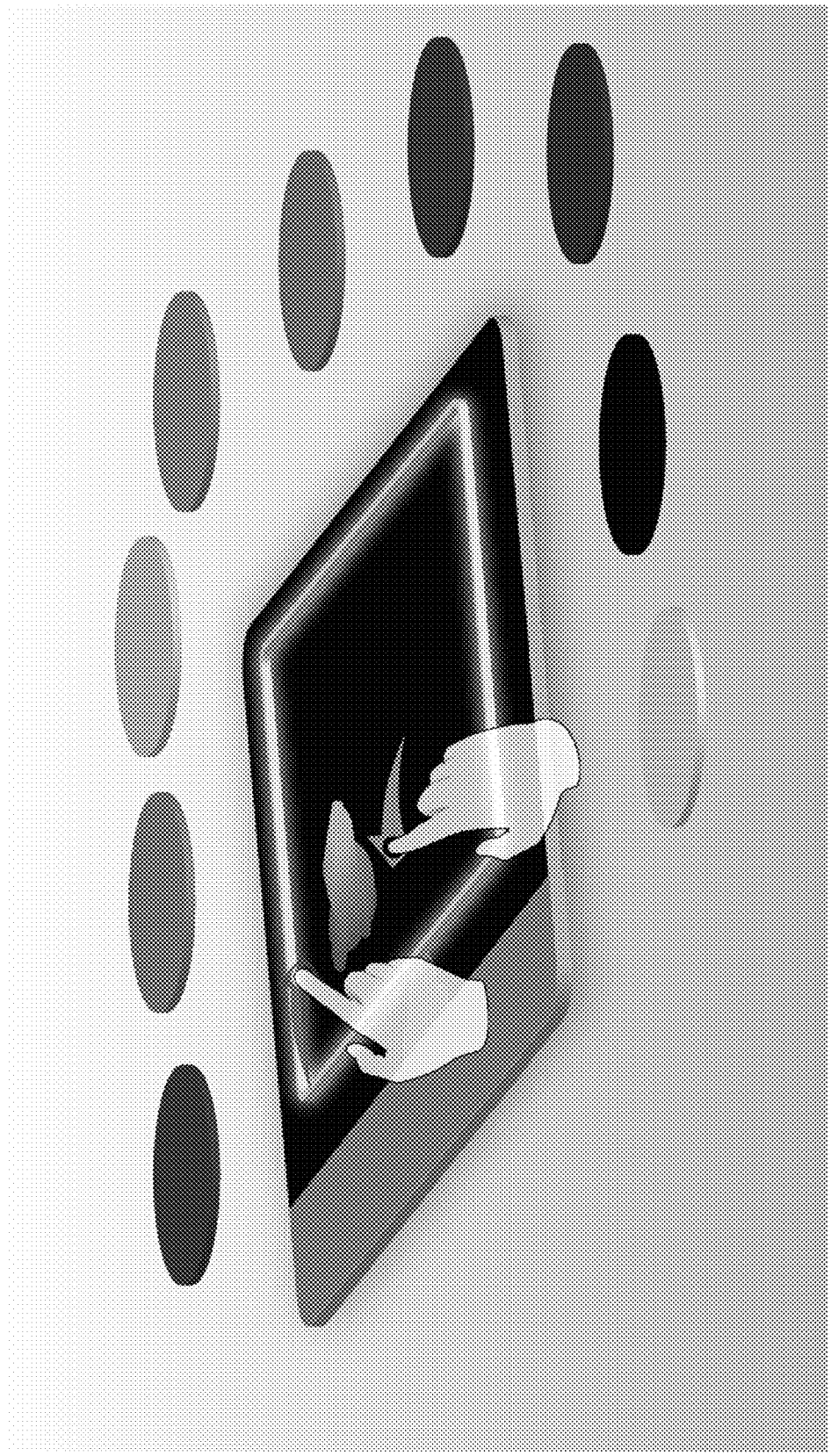
Figure 13:
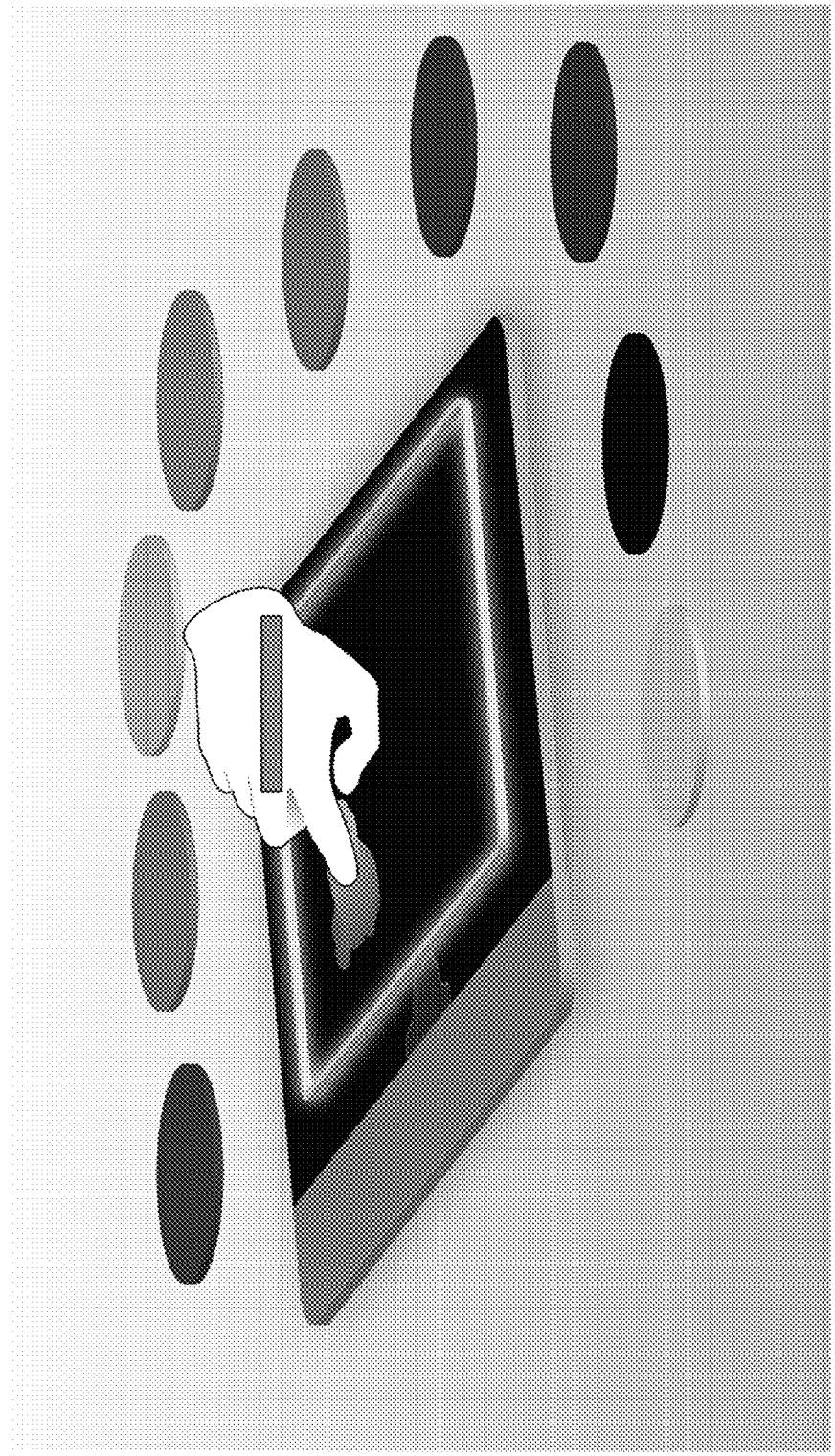
Figure 14:
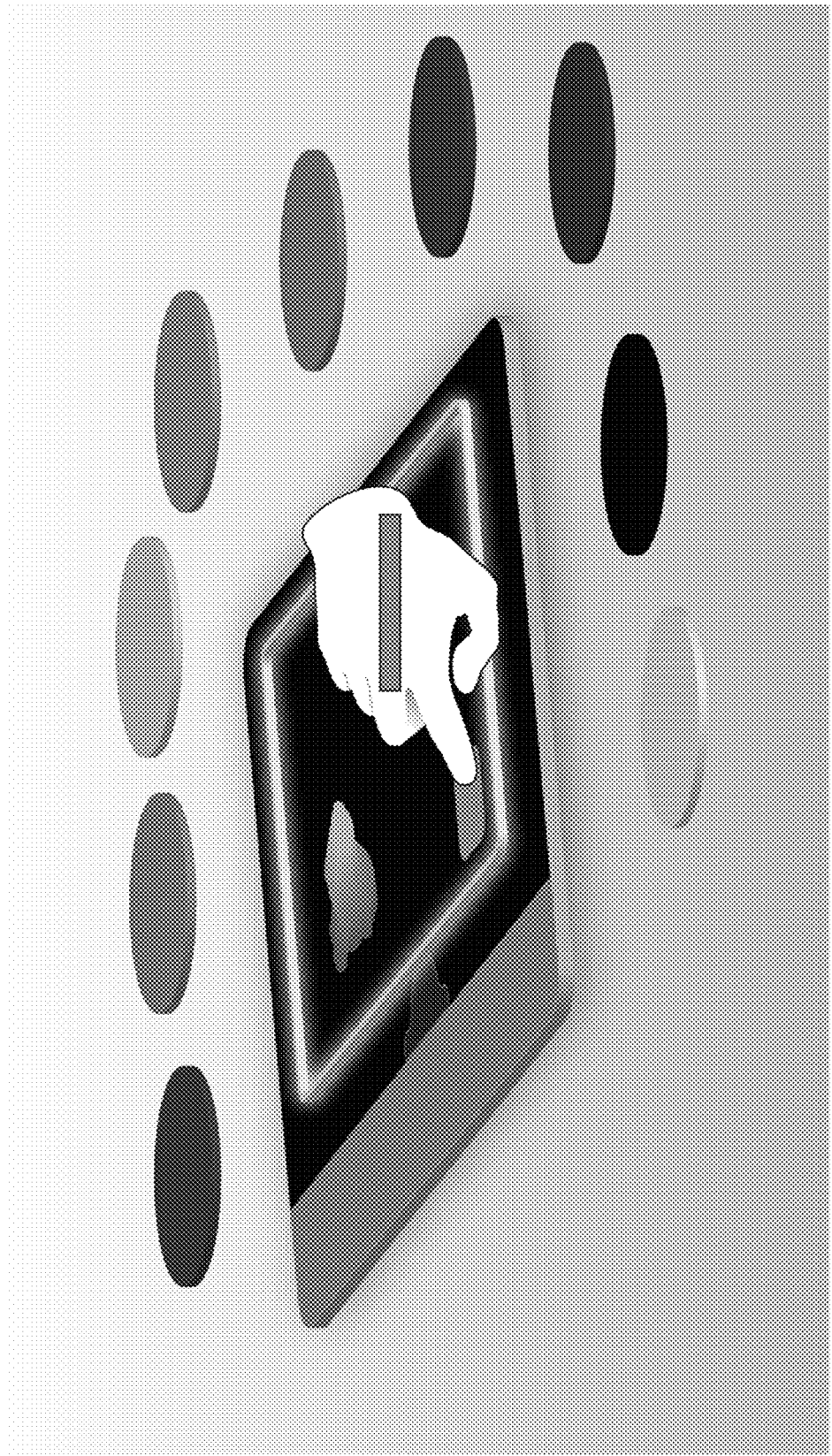
Figure 15:
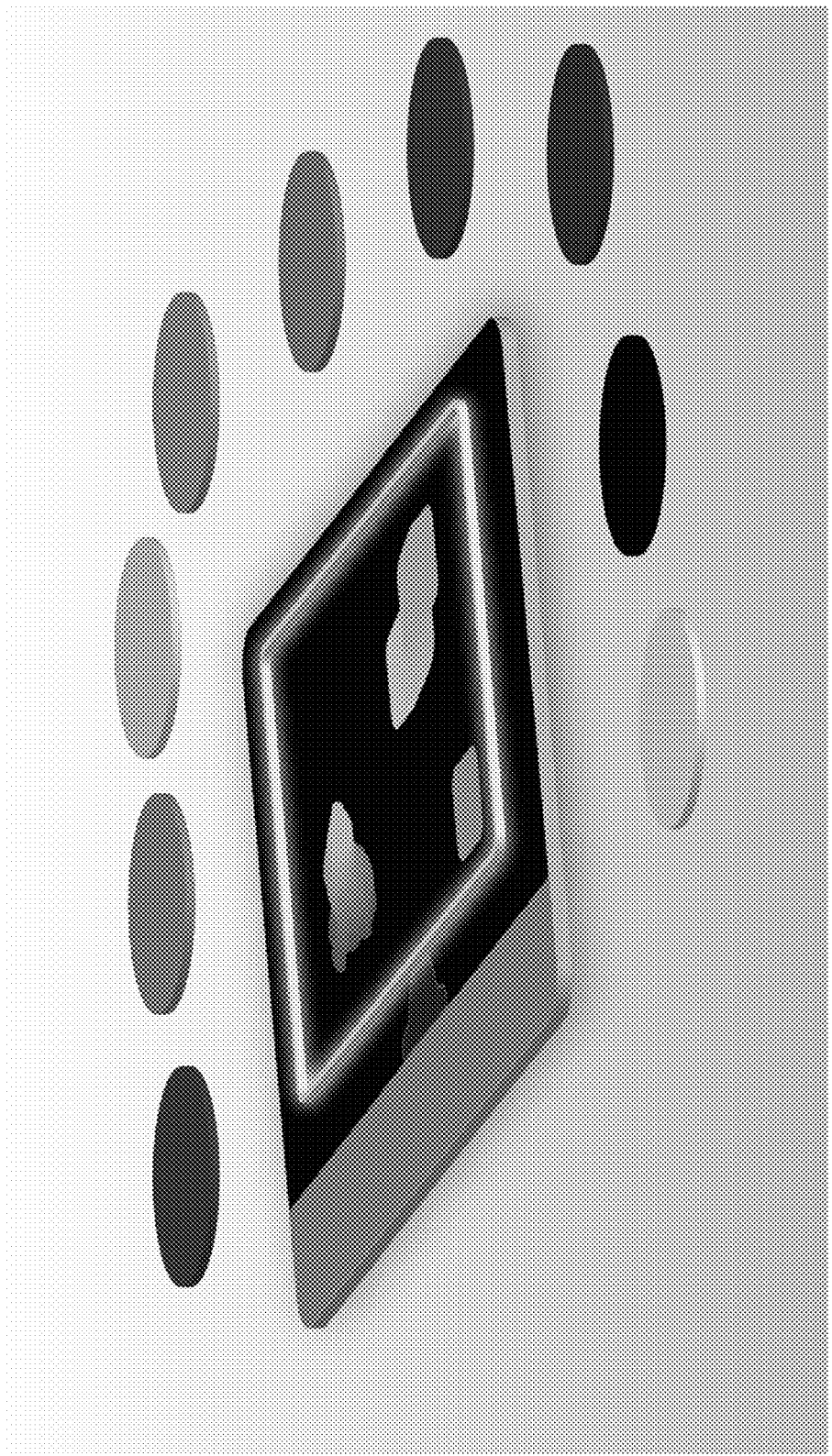

In the embodiment shown, the user can use the finger to mix paint on the palette (FIGS. 11 and 12). The user can also use a paint sponge to remove paint from the palette (FIG. 13). In one embodiment, the user can place paint on the side of the palette to be used later (FIG. 14). In one such embodiment, multiple colors placed on the palette may be combined using a swipe gestures (FIG. 15).

Figure 16:
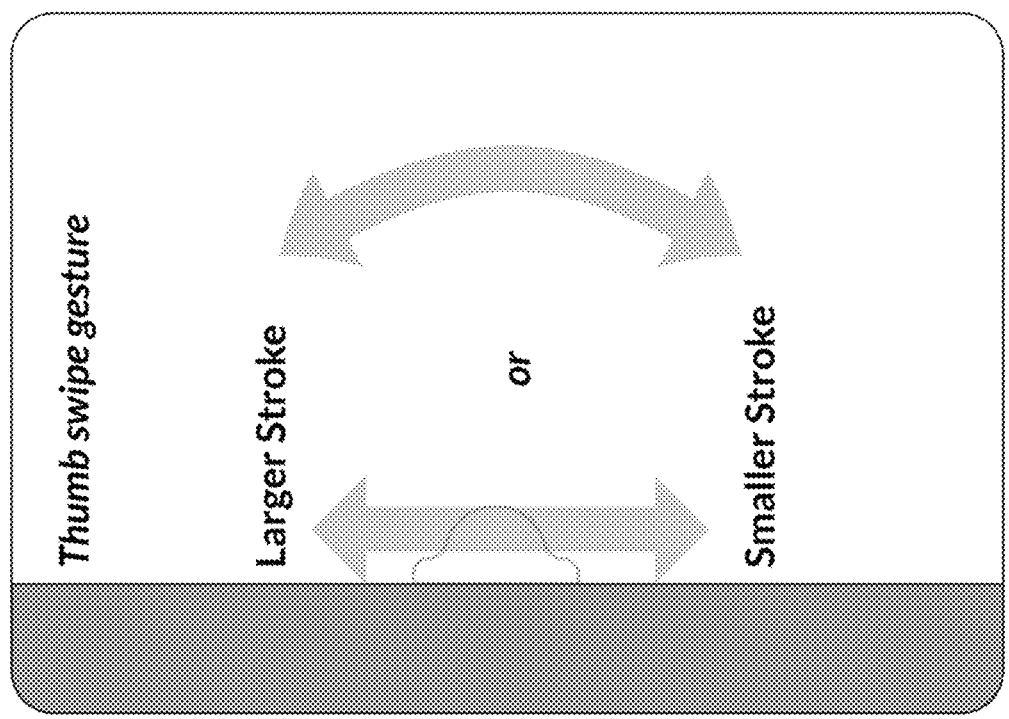
FIG. 16 is an illustration of a user interface for varying a tool in one embodiment.

FIG. 16 is an illustration of a user interface for varying a tool in one embodiment.

In the embodiment shown, the user is able to change the size of the brush using gestures. For instance, to change the size of the brush, the user swipes up or down on the left edge of the palette. Various gestures might be supported. For instance, the gesture may be curved. The size is based on the length of the movement (i.e., the delta between the beginning and end of the gesture); it is not mapped to specific positions on the tablet of in space. In one embodiment, the size may be previewed over the virtual hand holding the brush tool.

Figure 17:
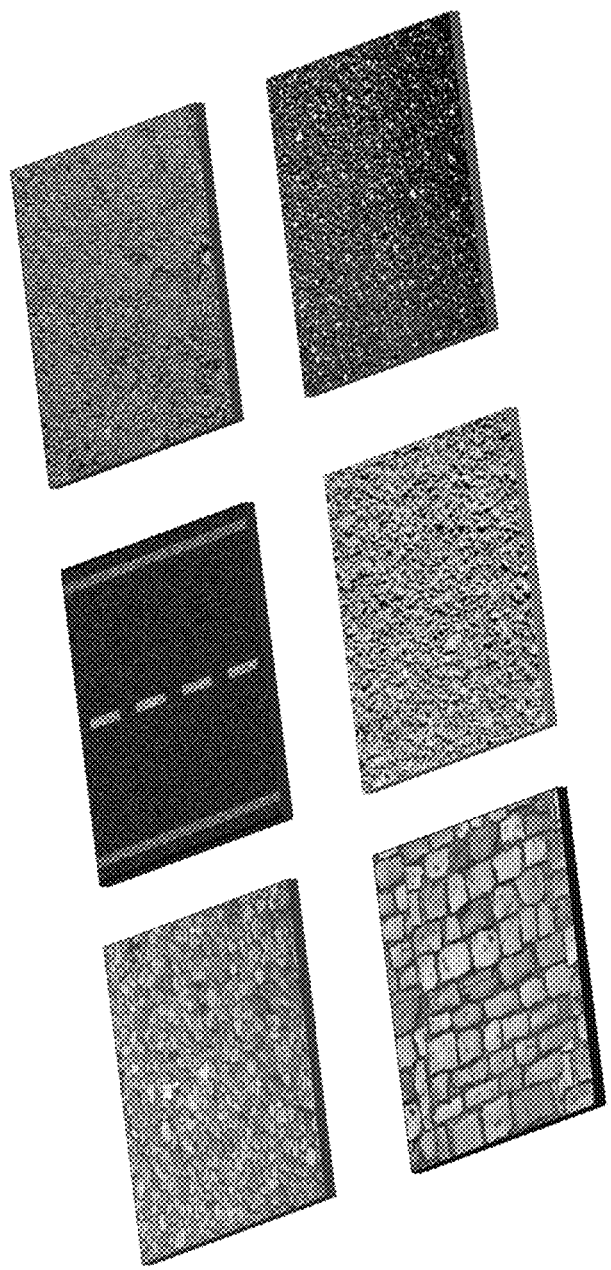
FIG. 17 illustrates a palette for creating paths, such as roads, in one embodiment.
Figure 18:
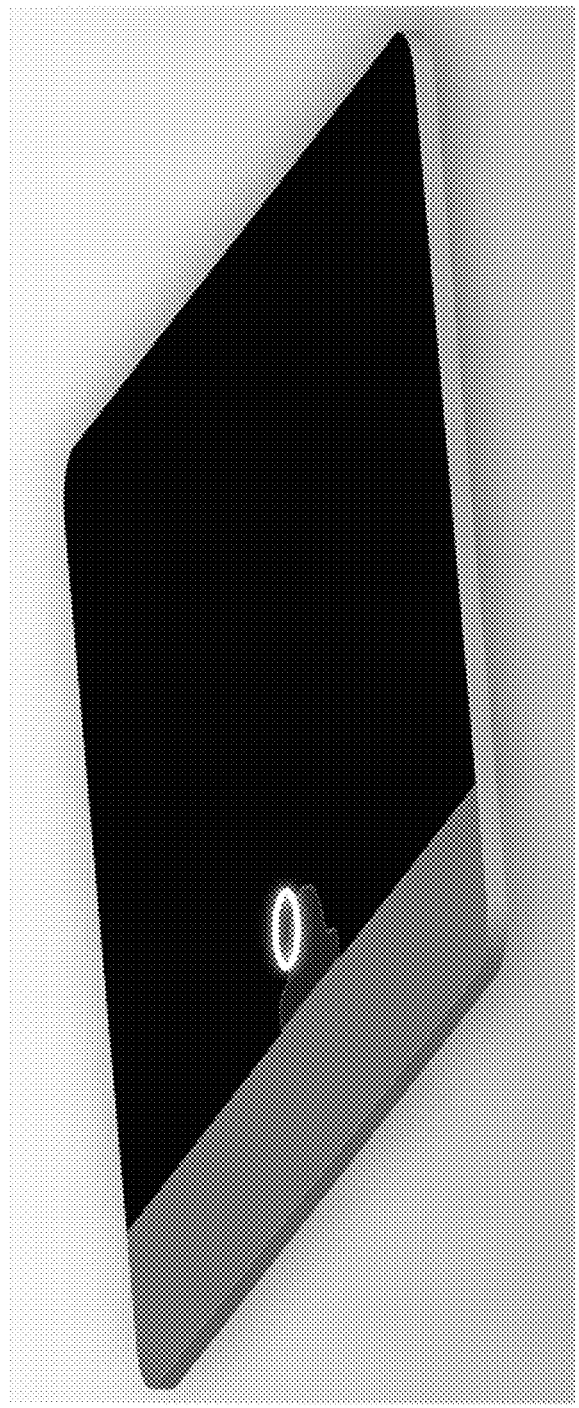
FIGS. 18-24 illustrate various states that may be utilized in some embodiments.

FIG. 17 illustrates a palette for creating paths, such as roads, in one embodiment. In the embodiment shown, a content creator, for instance, an artist wearing an HMD can "paint" various roads in a gaming environment. Once the roads are painted, other users can spawn vehicles to drive around the drawn roads, feeling the haptics based on the road texture the vehicle goes over. The user that creates the car may also control the car, causing it to start, accelerate, brake, and stop. FIG. 17 shows road types that might be used, such as asphalt, dirt and cobblestone. These types are not exclusive. In other embodiments, the road types may include streets, ravel, wet roads, rails, and flight paths.

FIGS. 18-24 illustrate various states that may be utilized in some embodiments. In the embodiment shown in FIG. 18, the device is in STATE 0, which corresponds to off. In the off state, the palette has not been activated, and the only control shown is the "on" button.

Figure 19:
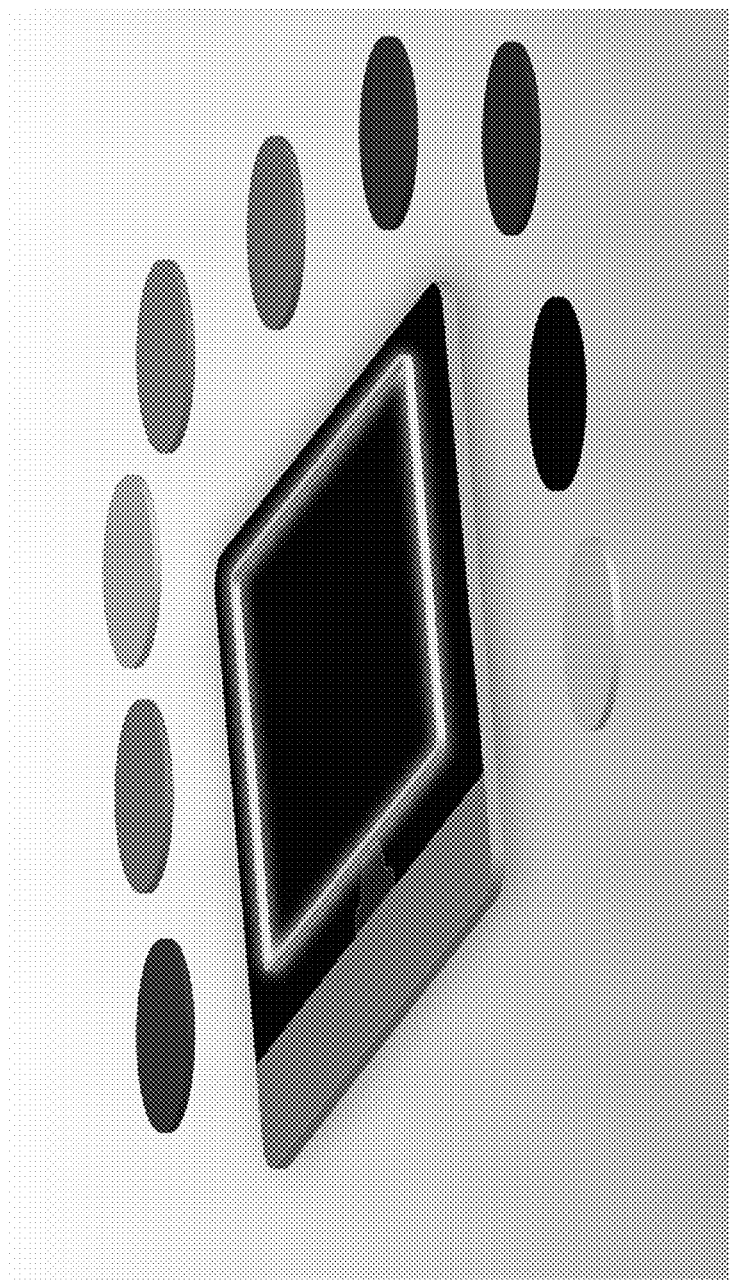

FIG. 19 illustrates the digital pad and palette shown in another state, STATE 1, which is the paint state. In one such an embodiment, paint applied to the tablet is saved when going to other states, so that it will return upon return to painting state. The paint state allows a user to make changes to the environment, such as painting scenery.

Figure 20:
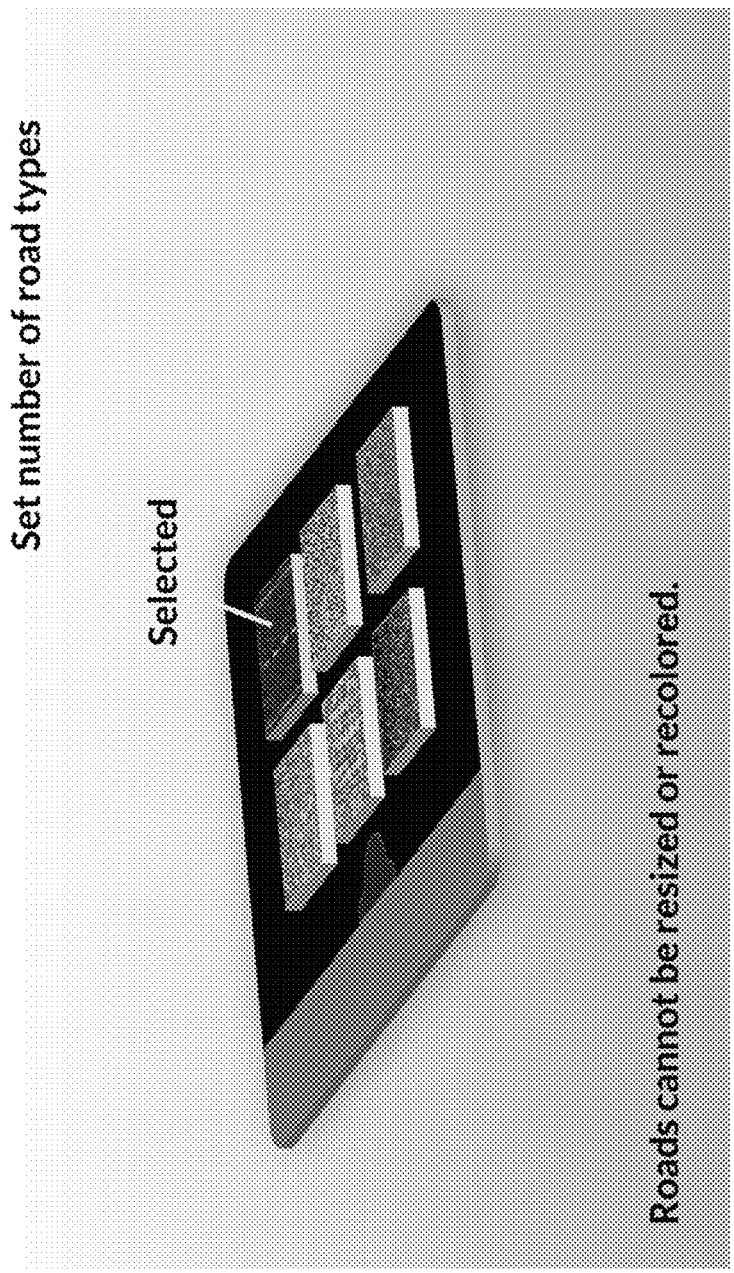

FIG. 20 illustrates an embodiment that includes a STATE 2, which is a state for creating roads. In the embodiment shown, paint does not persist in this state in order to provide enough room for road selection. The purpose of roads in the embodiment shown is to provide a route for mobile users to control a vehicle. Road "swatches" may alternatively be selected with same leaf interaction as paint. The road width may vary. For instance, the road may be broad enough to accommodate two cars side-by-side.

However, in the embodiment shown, the brush size control may be disabled. In one embodiment, a spawned car would attach to the "top" of the brush, so the "bottom" would not be textured. Also, in such an embodiment, as the brush is used to paint the road, one end of the road will connect to the end of another road or the other end of the same road to create a contiguous road. For instance, the ends of brush strokes may snap to one another. In another embodiment, the two ends may be automatically connected by a straight line. FIG. 20 illustrates the various road types displayed on a pad.

In some embodiments, the mobile application allows the user to spawn an object to travel along the drawn roads. Then, based on the movement, the surface, properties of the vehicle, and other properties of the environment, haptics are output. In one such embodiment, the spawned vehicle begins at a set location on the road. For instance, the car may start where the user creating the road begins the road.

Figure 21:
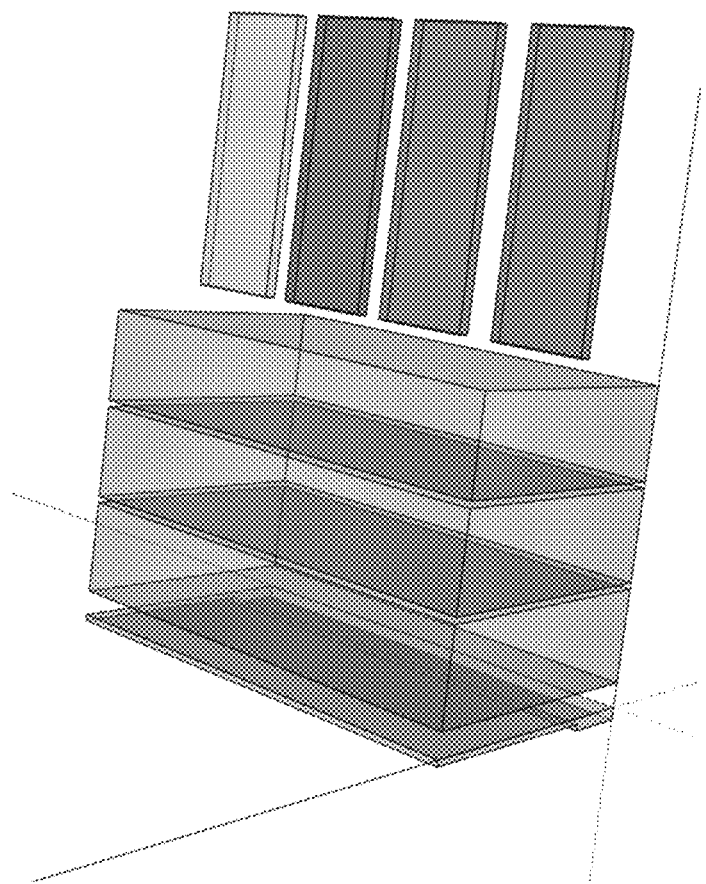
Figure 22:
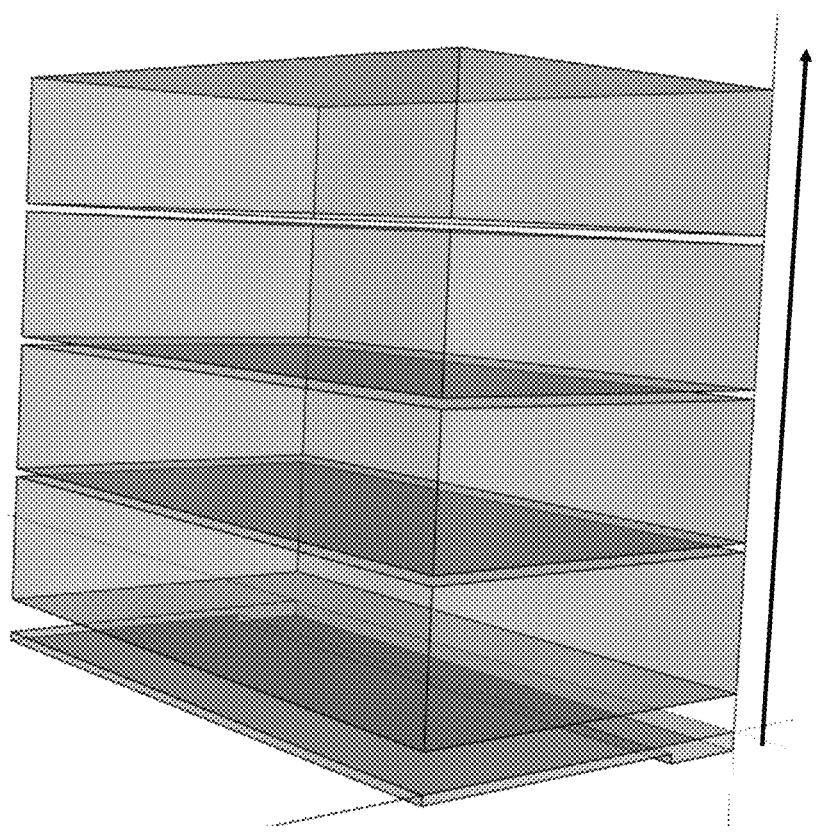

FIGS. 21 and 22 illustrate an embodiment that includes a STATE 3, which includes a user interface for performing a state change. In the embodiment shown, a tertiary user interface ("UP") provides that a user tilts a tablet 90 degrees so that it is perpendicular to the ground. The user is then presented with a variety of labels, such as paint, roads, and options. Each of these labels may include sub labels, for example, for options, the user may be presented with the following: save, auto-naming, clear drawing space, load, and exit. In various embodiments, the user may interact in different ways. For instance, the user may place a drawing finger in a state and click a button. In another embodiment, a user may hold a thumb button, traverse tablet position in Y axis (so within one of the layers) and the release the button.

FIG. 22 illustrates another embodiment for performing a state change. In the embodiment shown, the user presses and holds a thumb button on a palette to freeze the various state boxes in space. Then the user moves the tablet into a particular state box and releases the button to select a particular state. The states could include layers, such as different colors or road types.

Figure 23:
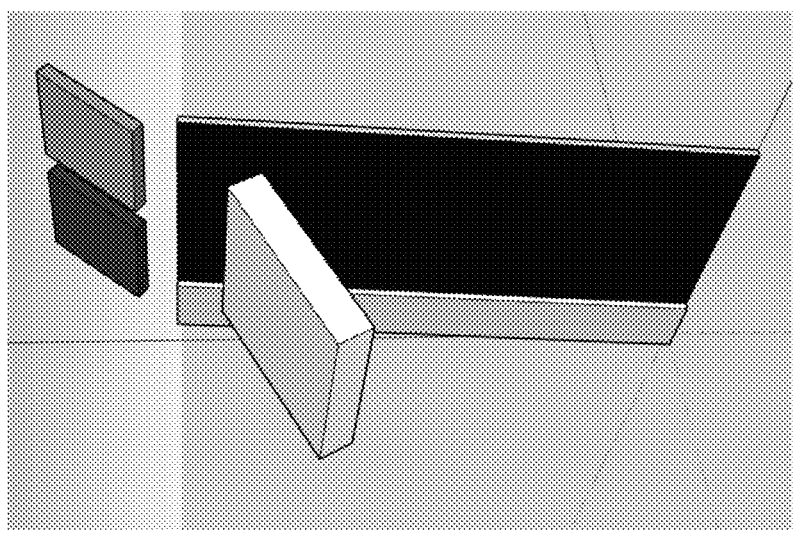

FIG. 23 illustrates an embodiment that includes a STATE 4, which includes a user interface for performing a quick action. The user first tilts the tablet towards the user. In response, the swatches animate to behind the tablet, and the paint melts away. Options that might be provided by such an interface could include, undo, redo, eraser, clear palate, and save.

Figure 24:
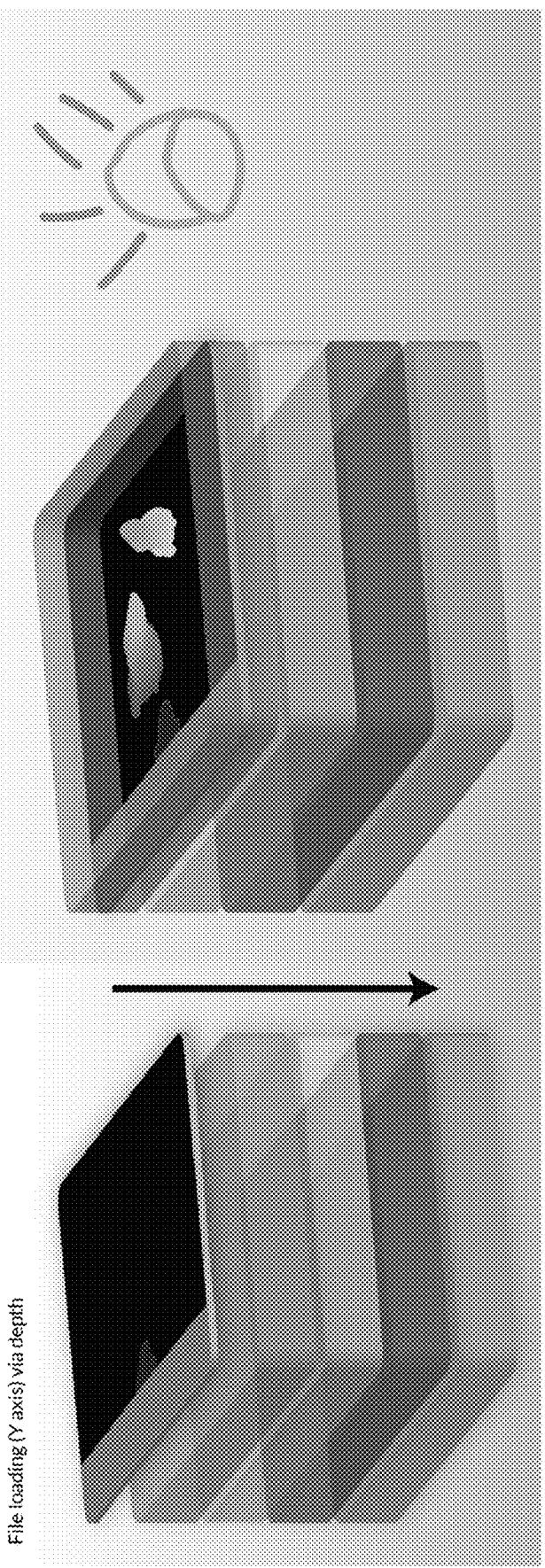

FIG. 24 illustrates an embodiment that includes a STATE 5, which includes a user interface for loading and previewing saved files. With such a user interface, the user can move the tablet vertically through various layers to load particular files. In some embodiments, the drawings can be previewed before loading. Once "load" is selected from the options panel, the user can return the tablet to normal operation.

FIGS. 25-32 illustrate various embodiments for interacting with a virtual environment with a "magic window" application. The magic window application may be used to view a virtual or augmented reality environment. The application may be utilized by more than one user simultaneously so that they can interact with other users in the environment. In some embodiments, the Magic Window allows viewers to view an artist's actions in the virtual environment as it happens. In other environments, the viewer sees a collection of activities after they have happened in an asynchronous manner.

Embodiments of the Magic Window application provide haptic feedback related to aspects of the environment. In some embodiments, such aspects include other users' interactions with the virtual environment, including, for example, actions by the content creator. The Magic Window application may also provide additional functionality, such as allowing a viewer to control aspects of the environment including controlling a car on a road as described above.

Figure 25:
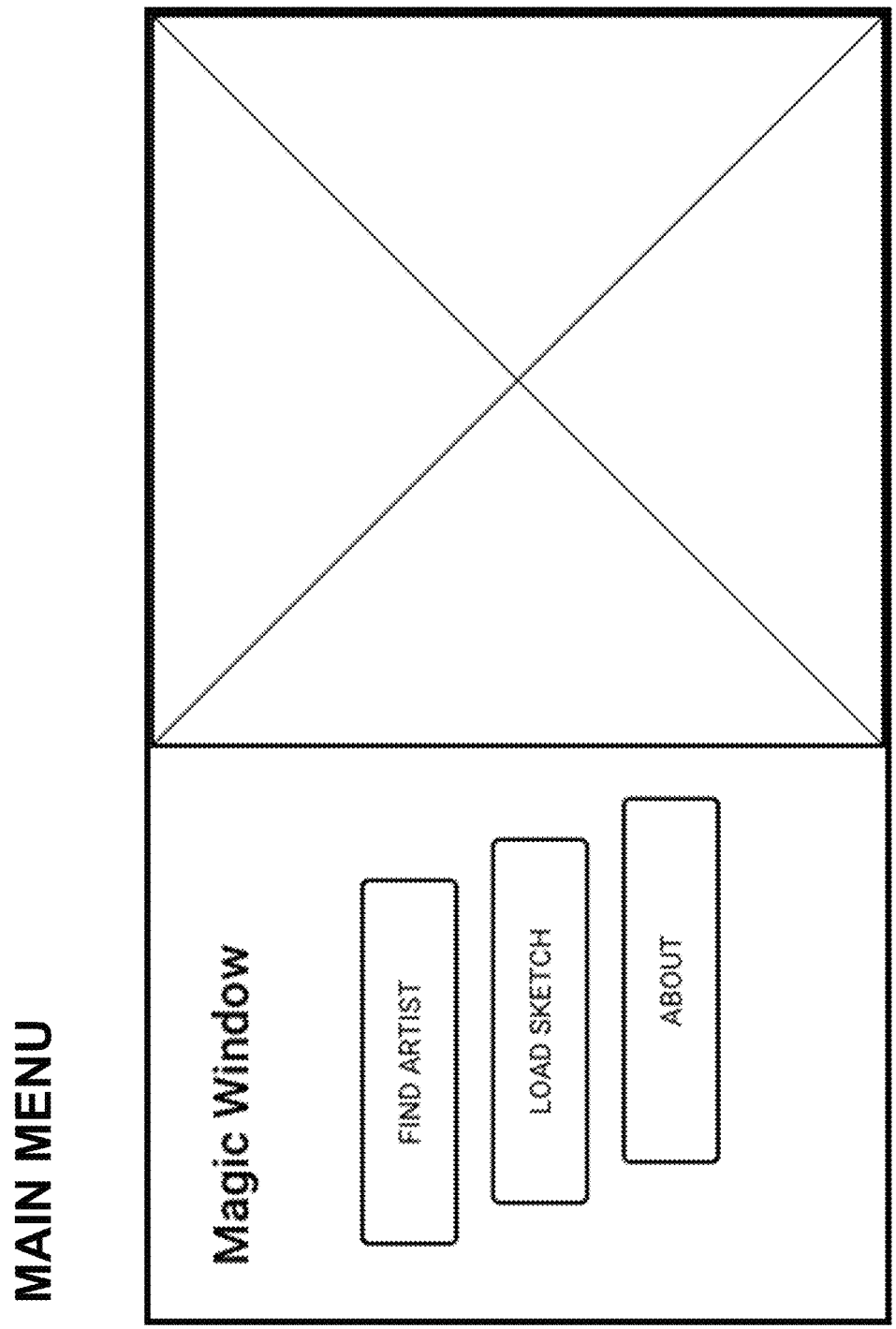

FIG. 25 illustrates a main menu display in one embodiment of a Magic Window application. The main menu shown provides a menu, which allows users to find an artist to view, load a sketch (not MVP), and load information about the application. The "Find Artist" option may automatically connect to a particular content creator or set of content creators or allow a viewer to search.

Figure 26:
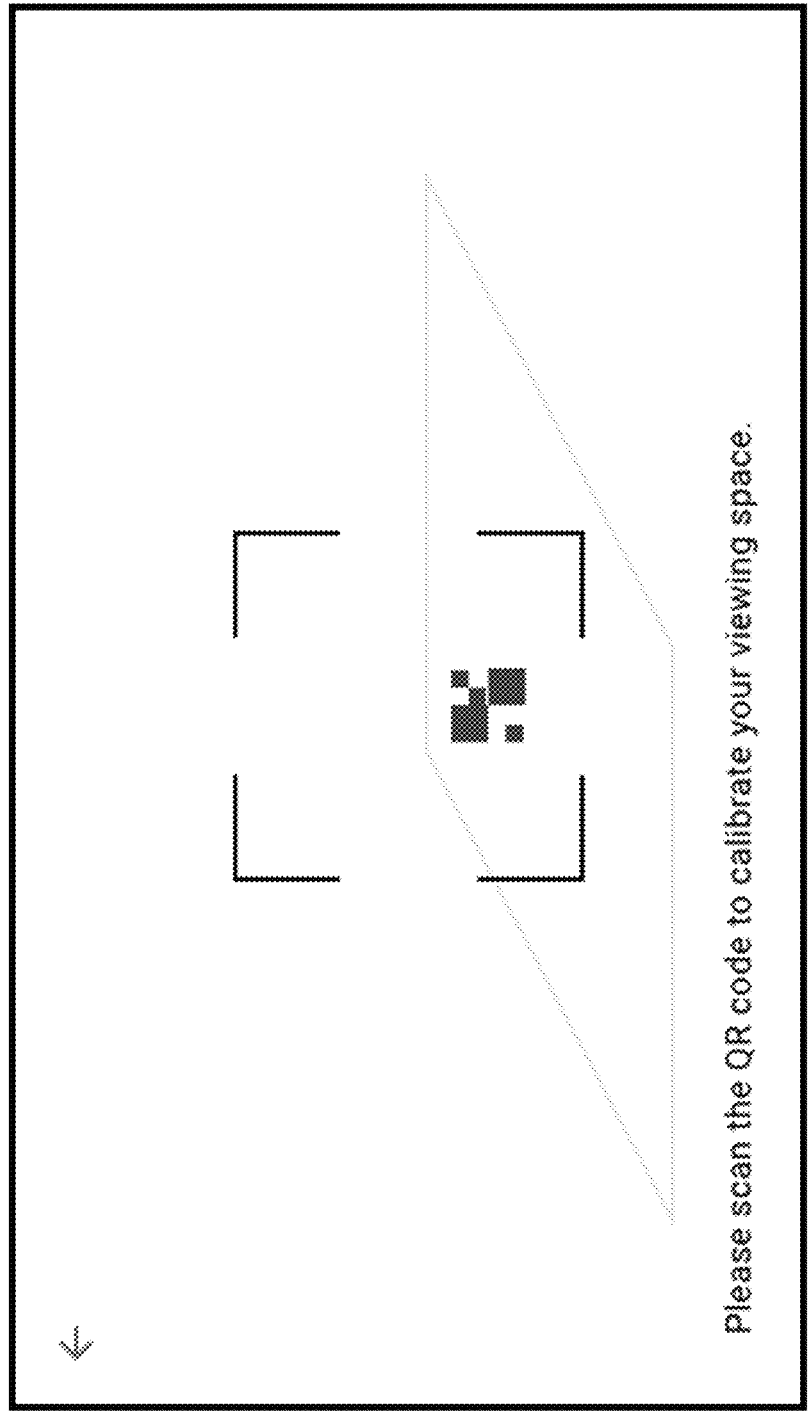

FIG. 26 illustrates an interface for grounding a view of a virtual environment. In the embodiment shown, the user initiates the application by, for example, connecting to a host. Then the user is prompted to scan a visual marker (e.g., a QR code) to calibrate the viewing space and thereby grounding the view.

Figure 27:
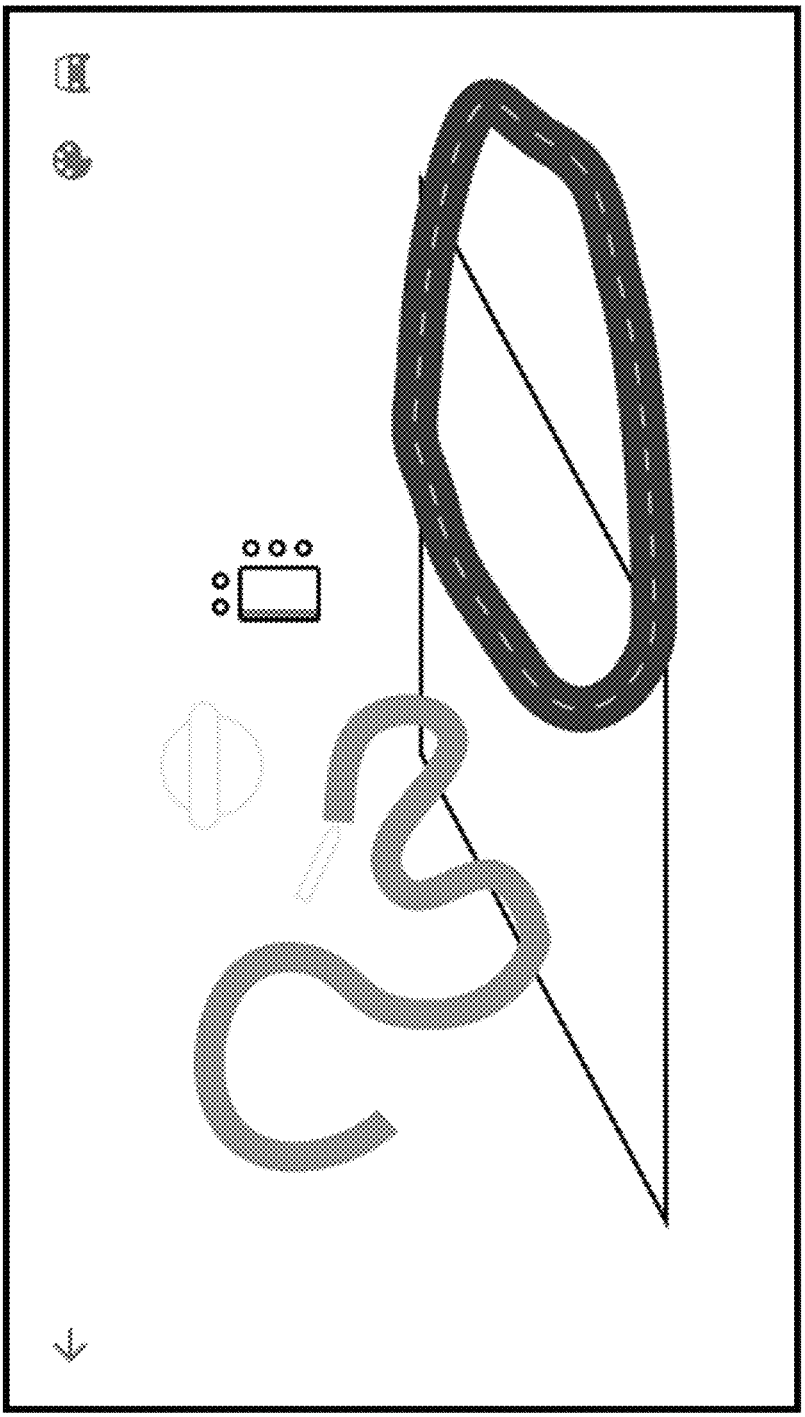

FIG. 27 illustrates the interface once the view is calibrated. The viewer is able to see the content created by the content creator as well as any changes occurring in real time. In the embodiment shown, the artist is visualized using a palette. The top left of the screen includes an arrow for returning to the menu, such as the one illustrated in FIG. 25. And the top right includes icons illustrating the mode in which the interface is executing.

Figure 28:
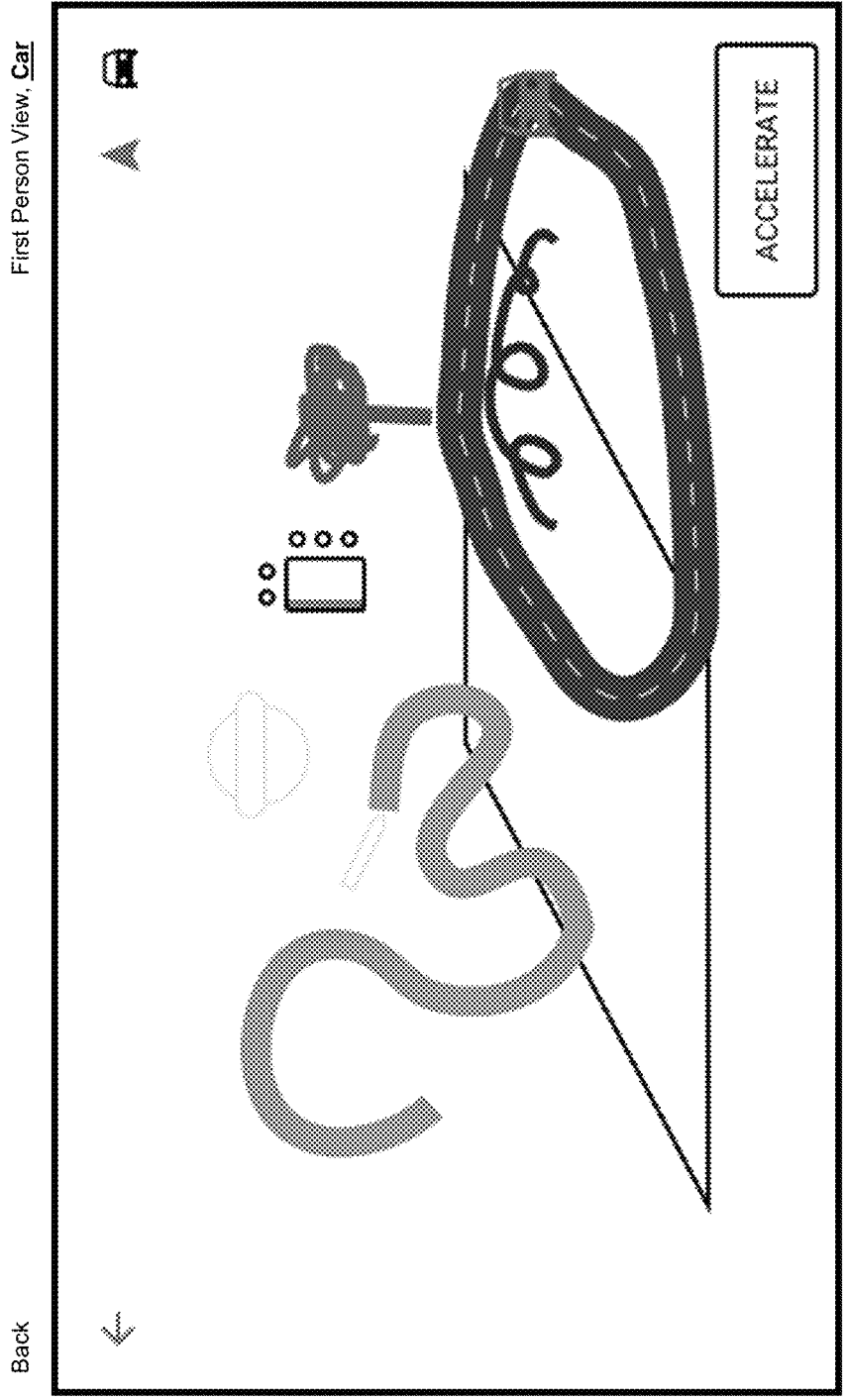

FIG. 28 is another embodiment of an interface displaying a rendering of an environment that includes a road and spawned car. A car button is displayed at the top right of the screen and allows the user to enable or disable a "car" mode. The car mode allows the user to control the acceleration of a car on roads. The interface may also allow the user to view the environment from inside the car. Such an interface may allow multiple users to concurrently spawn and control cars or other vehicles.

Figure 29:
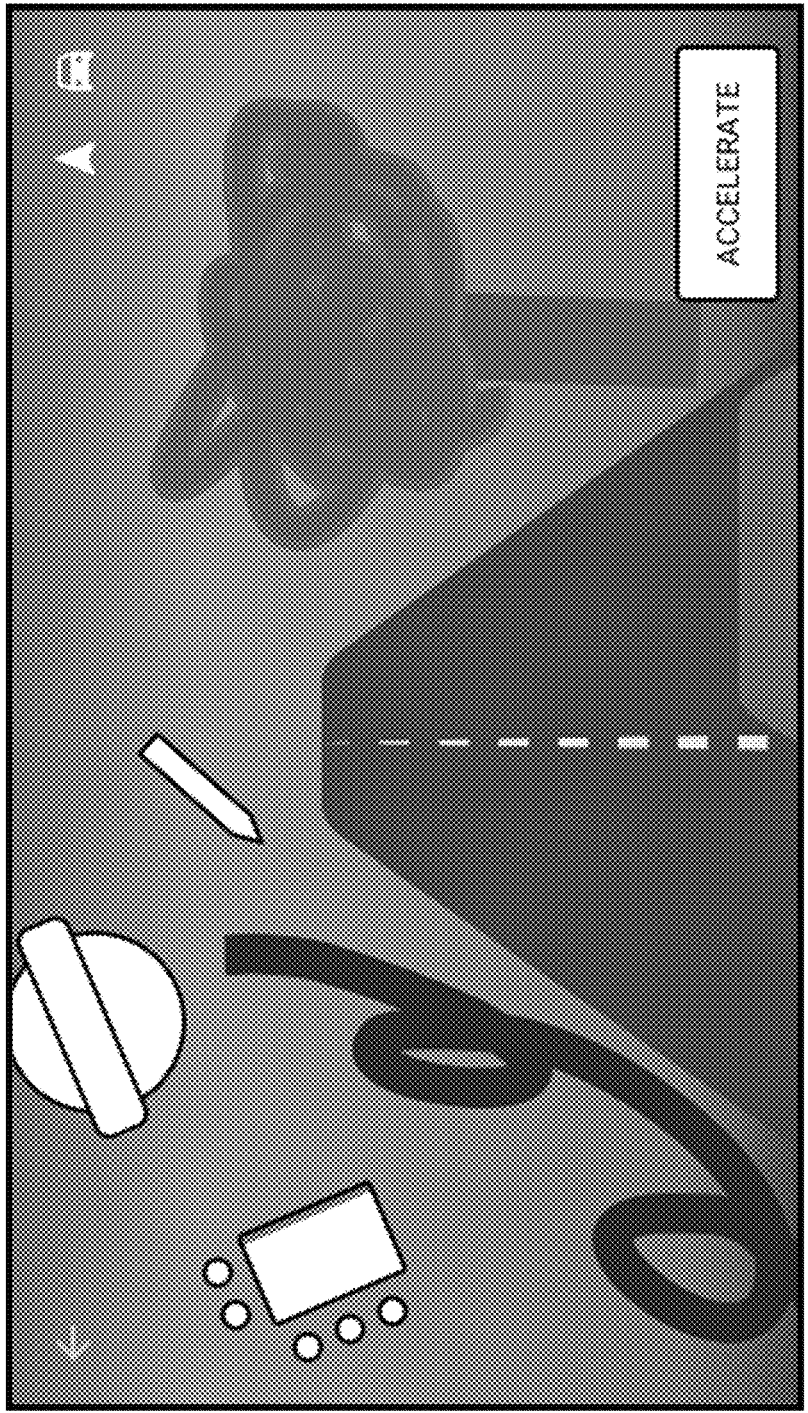
Figure 30:
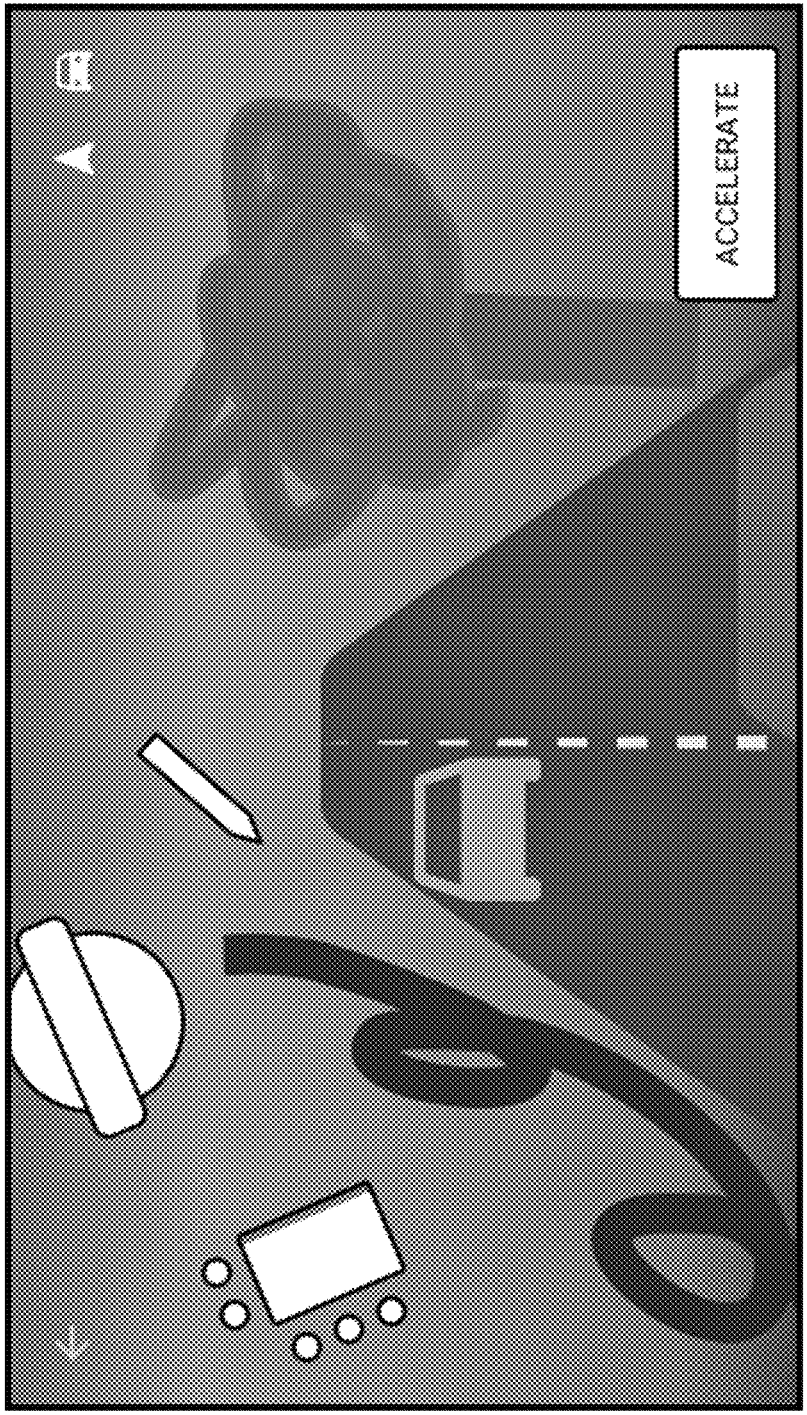

FIGS. 29 and 30 illustrate yet another embodiment of an interface displaying rendering of an environment that includes a road and a spawned car. In the embodiment shown in FIG. 29, the viewer is viewing the environment as if traveling in the car. As in the embodiment shown in FIG. 28, the user is able to control the car. This embodiment also provides a representation of an artist, who is visualized as a palette, pen, and head on the upper left of the display. In FIG. 30, multiple users have spawned cars, which are approaching one another on the road.

Figure 31:
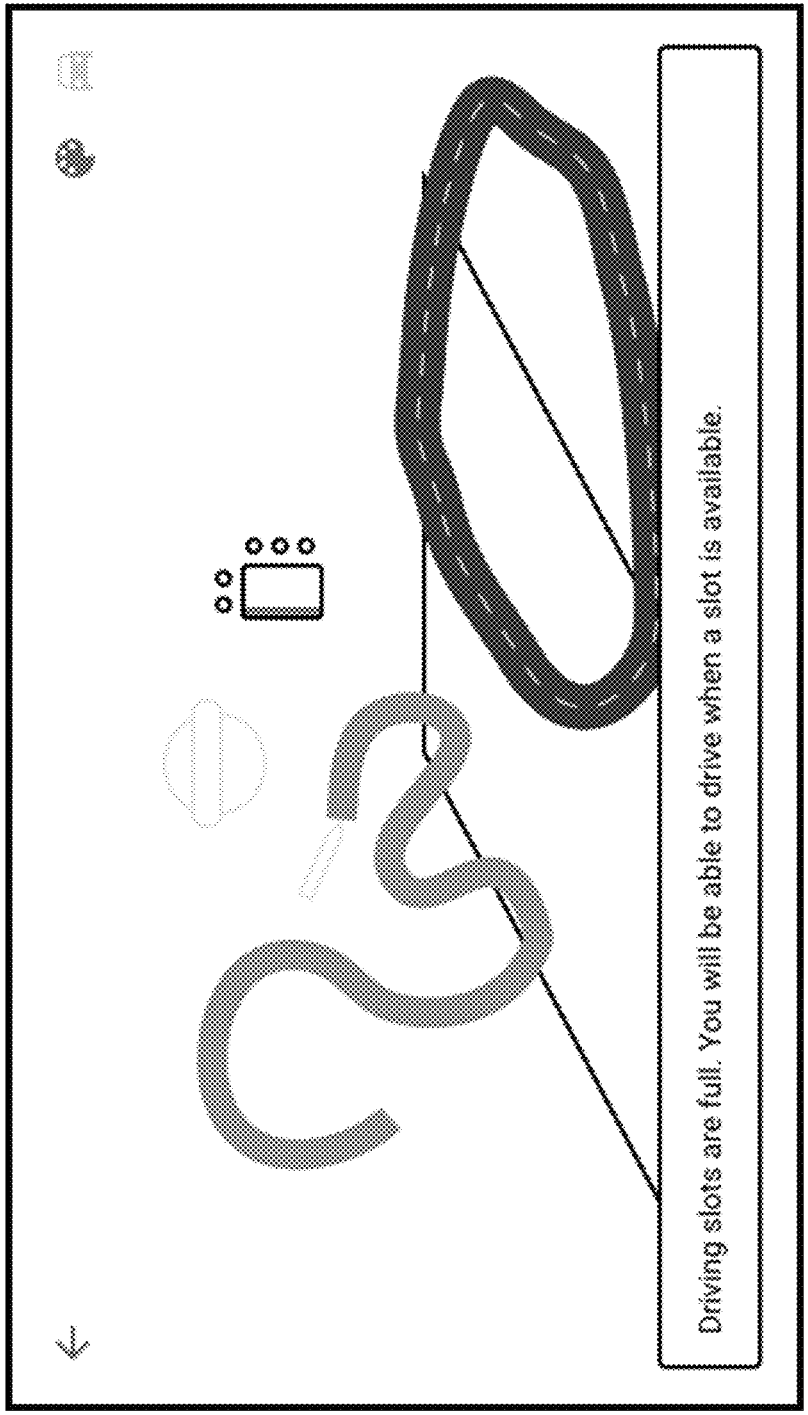

FIG. 31 is another embodiment and similar to the embodiment shown in FIG. 27. In the embodiment shown in FIG. 31, the application allows a maximum of two cars to be spawned on the road. If a user attempts to spawn another car, the application responds with an error message, informing the user that all slots are currently full.

FIG. 32 is an embodiment illustrating a more complex road and traffic implementation. Such an embodiment may be useful in a multi-player race game. Such an embodiment may comprise enhanced road physics, the ability to fall off a map, the ability to crash into other cars, and multiple opponents. Other features that might be implemented include the capability to boost the power of the car and to allow the car to drift or perform other activities based on particular physics model. In some embodiments, multiple different races may occur on the same virtual road. In further embodiments, users may make changes to the road during game play, such as by making the road slick. Various other features of conventional racing games may also be incorporated into embodiments of this invention. In some embodiments, a low-poly simplified style may be desired for roads and cars, depending on how it looks with brush stroke environment.

Figure 33:
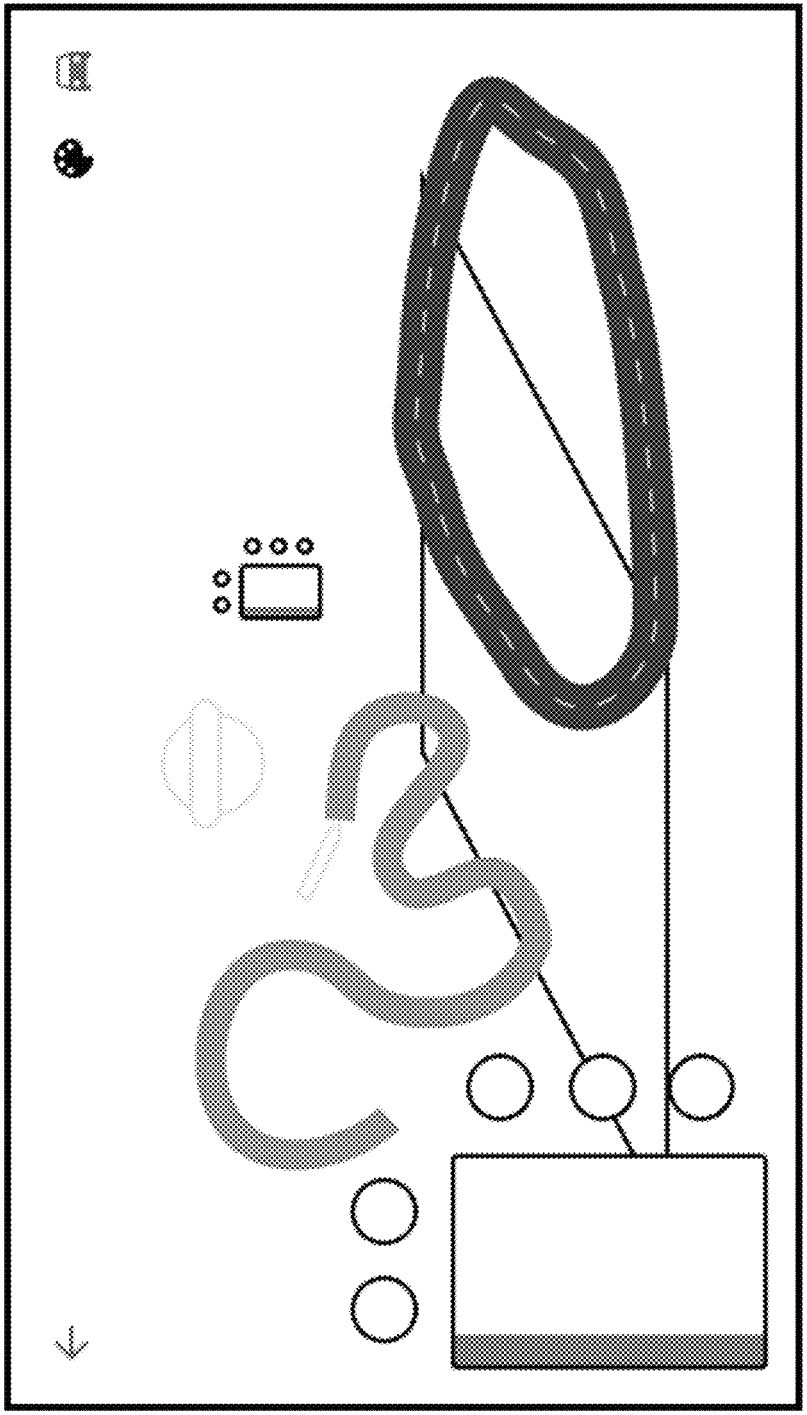
FIGS. 33 and 34 illustrate embodiments of a content-creator application user interface.
Figure 34:
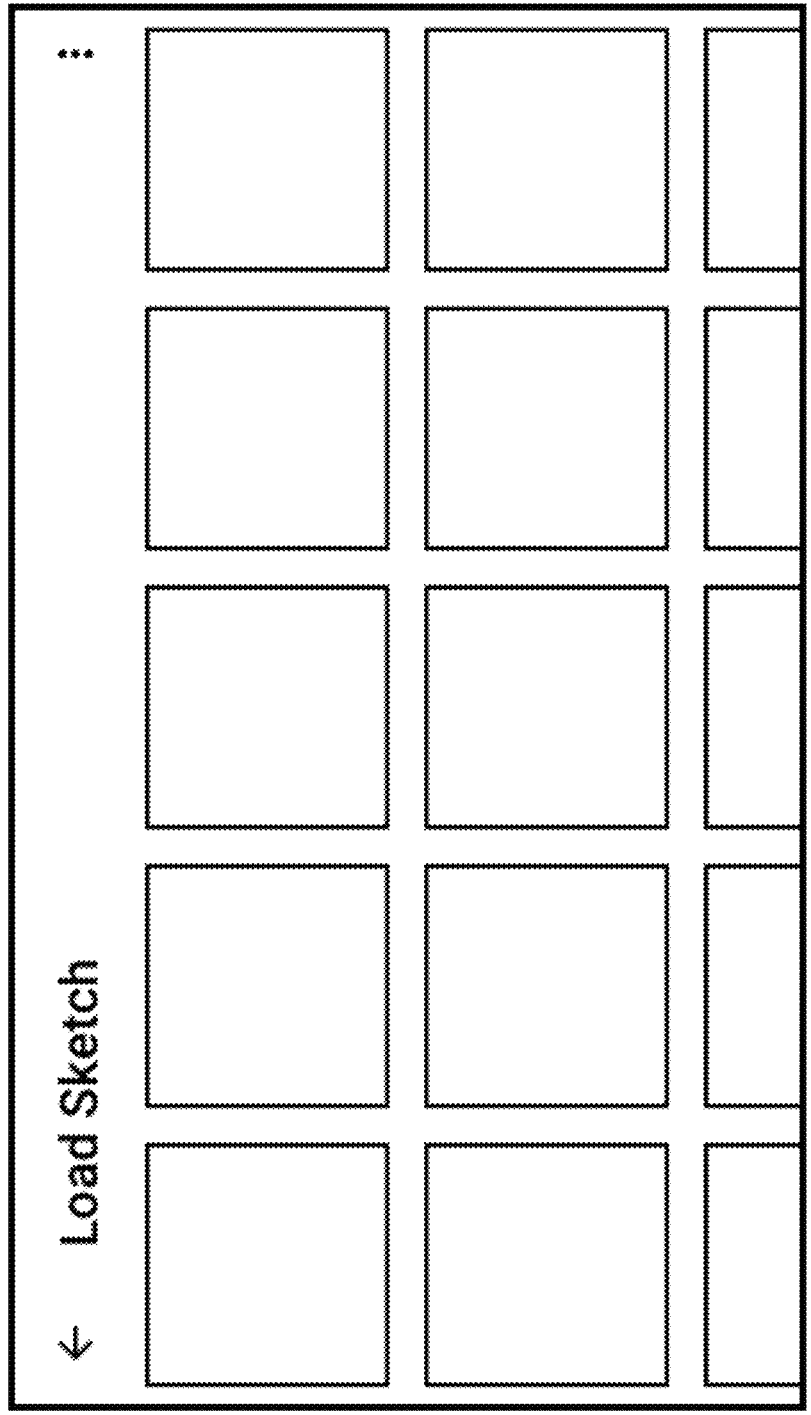

FIGS. 33 and 34 illustrate embodiments of a content-creator application user interface. Similar to the embodiments shown in FIG. 25-32, the embodiment shown in FIG. 33 allows a content creator a window into the virtual environment. In the embodiment shown in FIG. 33, the content creator can tap the palette icon to enable or disable palette view. This allows the user to see a larger visualization of the artist's tablet configuration. FIG. 34 illustrates an interface for accessing sketches. In the embodiment shown, to open a sketch, the user enters the sketch selection dialog from the main menu and then taps on a preview of a sketch to open.

In various embodiment, it is important to provide a compelling user interface. For example, in some embodiments, the position of the palette is tracked to the level of detail that an AR menu overlay can be applied to its surface. In such an embodiment, the menu is animated with a high level of detail and polish. Objects do not appear and disappear, rather, they row, move, morph, and transition. In further embodiments, the menu incorporates the "AR Leaf" concept, whereby some menu items appear in the space around the physical peripheral, and is interactive.

The menu may provide a variety of capabilities. For example, in one embodiment, the menu provides the ability to select brush type. In another embodiment, interaction design cues are taken from physical paint mixing as opposed to desktop computing. Each of these capabilities may be combined with compelling haptic feedback that is synchronized to the menu's animations.

Figure 35:
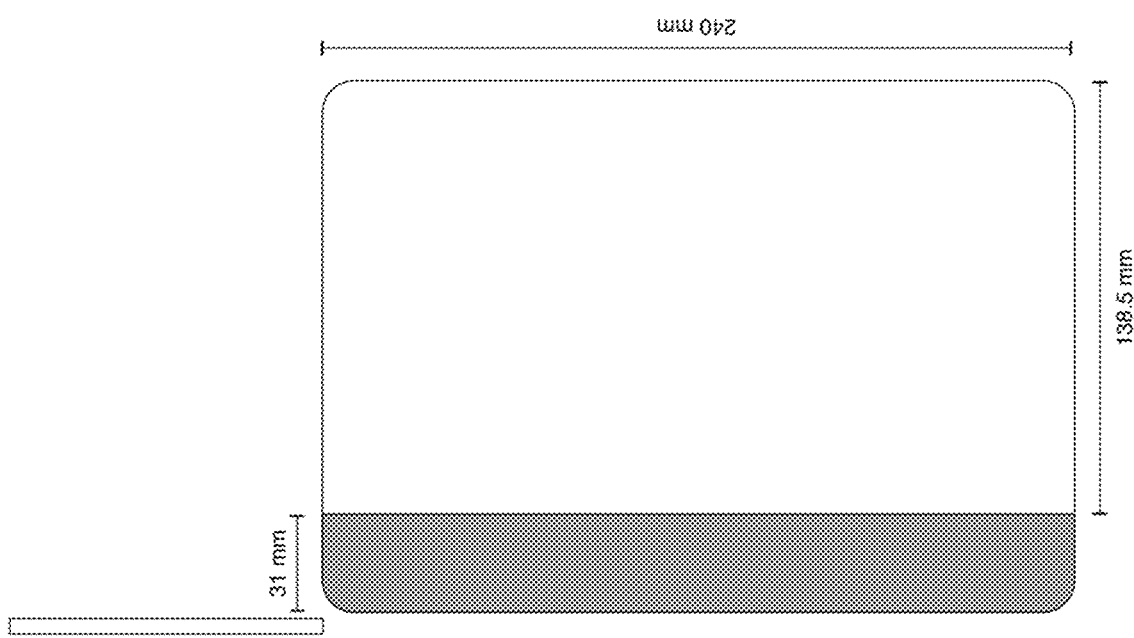
FIG. 35 illustrates a tablet that can be used in conjunction with various embodiments.

FIG. 35 illustrates a tablet that can be used in conjunction with various embodiments. The embodiment shown is a pressure sensitive wireless tablet. The tablet has a 31 mm casing for internals on the side, which will likely result in a user holding the tablet in a portrait orientation. The tablet may include an antenna at the top The embodiments described herein provide numerous potential interactions for a user. For example, an embodiment may include an "off" state to support a suggested hand position to hold tablet, selecting color from swatch "leaf," placing an amount of selected color on the tablet, and repeating process to mix and create/save new colors. Embodiments may also include state changes, gesture recognition, tool selection (e.g., brushstroke), file operations, and other operations.

Figure 36:
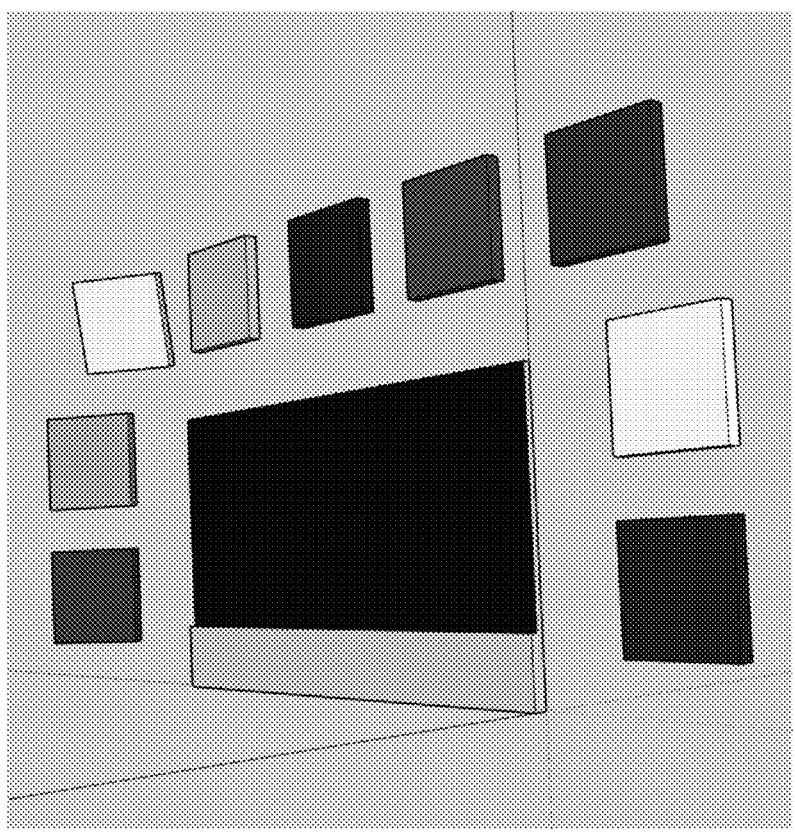
FIGS. 36-38 illustrate an embodiment in which the orientation in which the user holds the tablet controls the functionality available to the user.
Figure 37:
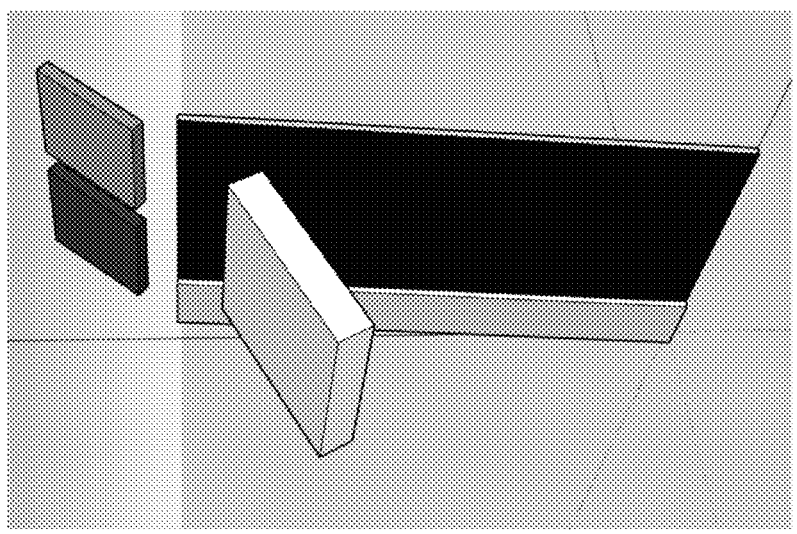
Figure 38:
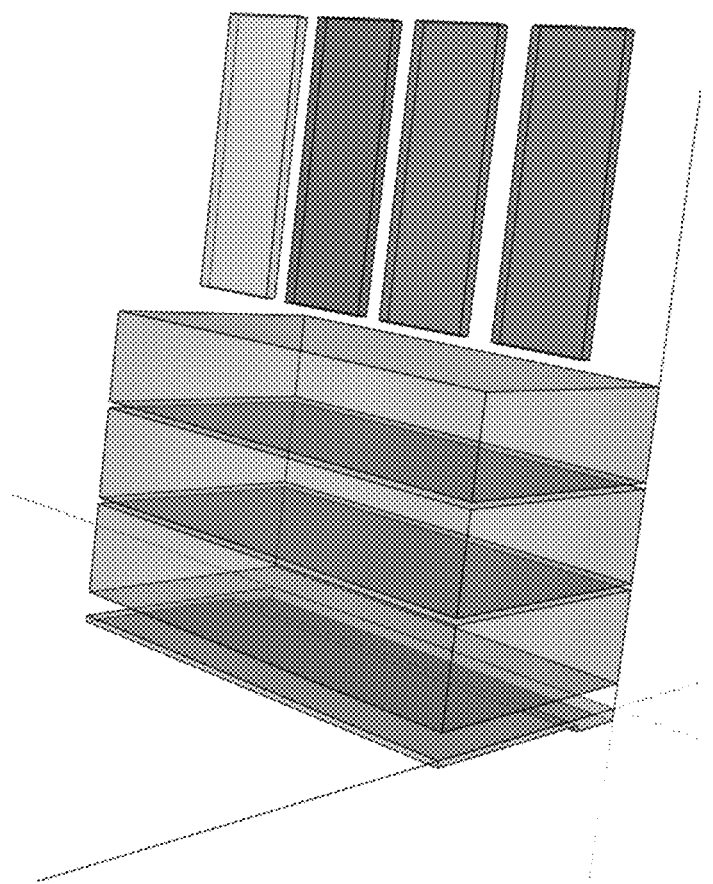

FIGS. 36-38 illustrate an embodiment in which the orientation in which the user holds the tablet controls the functionality available to the user. In an embodiment that utilizes six degrees of freedom and three dimensionality around the palette, menus may be contextualized based on the orientation that the tablet is held by the user. For example, such an embodiment may incorporate three types of interactions: (1) a primary interaction: paint and brush interactions (normal orientation), (2) a secondary interaction: brush selection (angling down/looking over the top), and (3) a tertiary interactions: save, clear, exit (angling tablet up to the left)

FIG. 36 illustrates an embodiment of the primary interaction, paint and bush sizing. FIG. 37 illustrates an embodiment allowing a user a second orientation that presents the user with quick action options. For example, when a user tilts the tablet towards the user, swatches animate to behind the tablet, and paints melt away. In such an orientation, paints and materials do not persist. This orientation may provide the following options: Undo, Redo, Eraser, Clear palette, and Save.

FIG. 38 illustrates yet a third orientation that allows a state change. This tertiary UI requires tilting tablet 90 degrees so that it is perpendicular to the ground. The user is then presented with several labeled "layers": Paint, Brushes, Materials, and Options. Further, the interface may provide multiple options, such as: Save, Leaning towards automatic naming scheme to avoid text input need, Clear drawing space, Load, and Exit application (if needed). Various interaction may be supported in this orientation, including: place drawing finger in state and click button, hold thumb button, traverse tablet position in Y axis (so within one of the layers) and release button.

Figure 39:
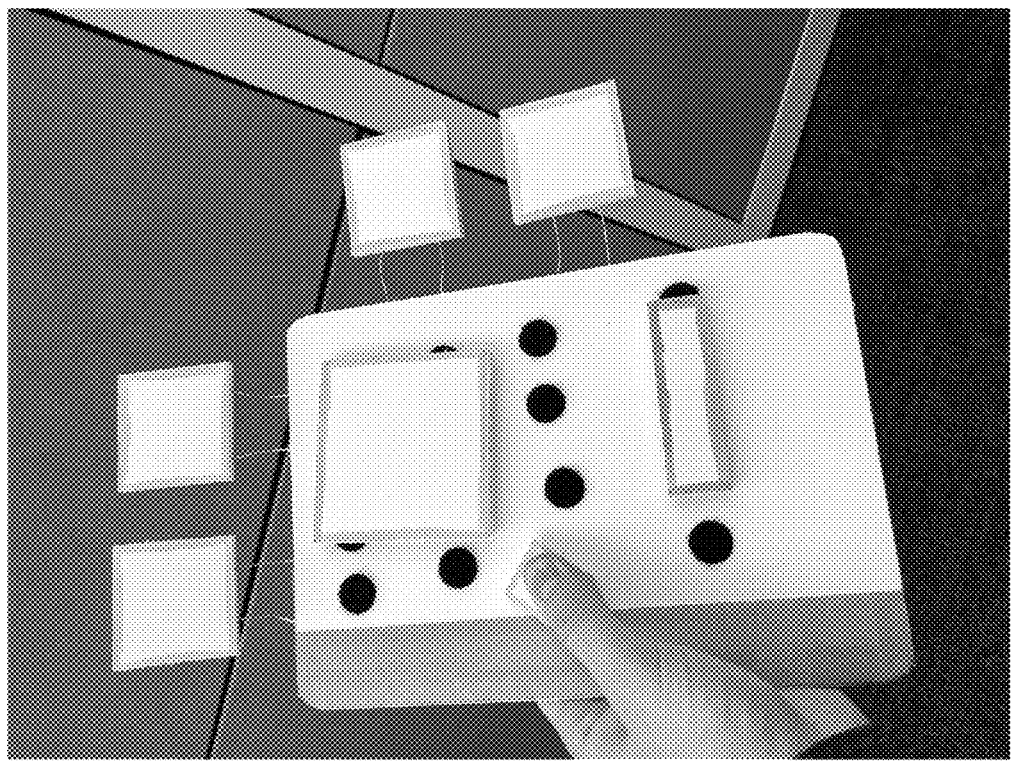
FIG. 39 is an illustration of how a tablet may be laid out for use in a virtual or augmented reality environment in one embodiment.

FIG. 39 is an illustration of how a tablet may be laid out for use in a virtual or augmented reality environment in one embodiment. In the embodiment shown, the "AR Leaf" is at least 2"×2". And the on-tablet touch interaction should be no smaller than 1"×1".

Figure 40:
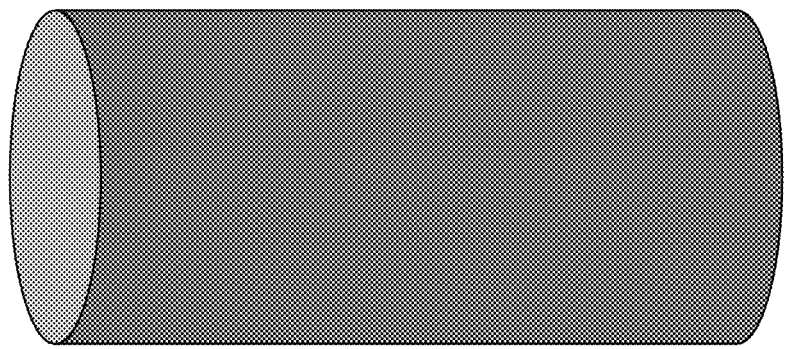
FIG. 40 is an illustration of a primitive object used to generate more complex objects in a virtual or augmented environment in one embodiment.

FIG. 40 is an illustration of a primitive object used to generate more complex objects in a virtual or augmented environment in one embodiment. In the embodiment shown, a primitive 3D object—a cone—is presented to the user. The user uses the cone to make a tree shape and then repositions the tree within the virtual or augmented environment. Various types of primitive objects may be presented in embodiments.

Figure 41:
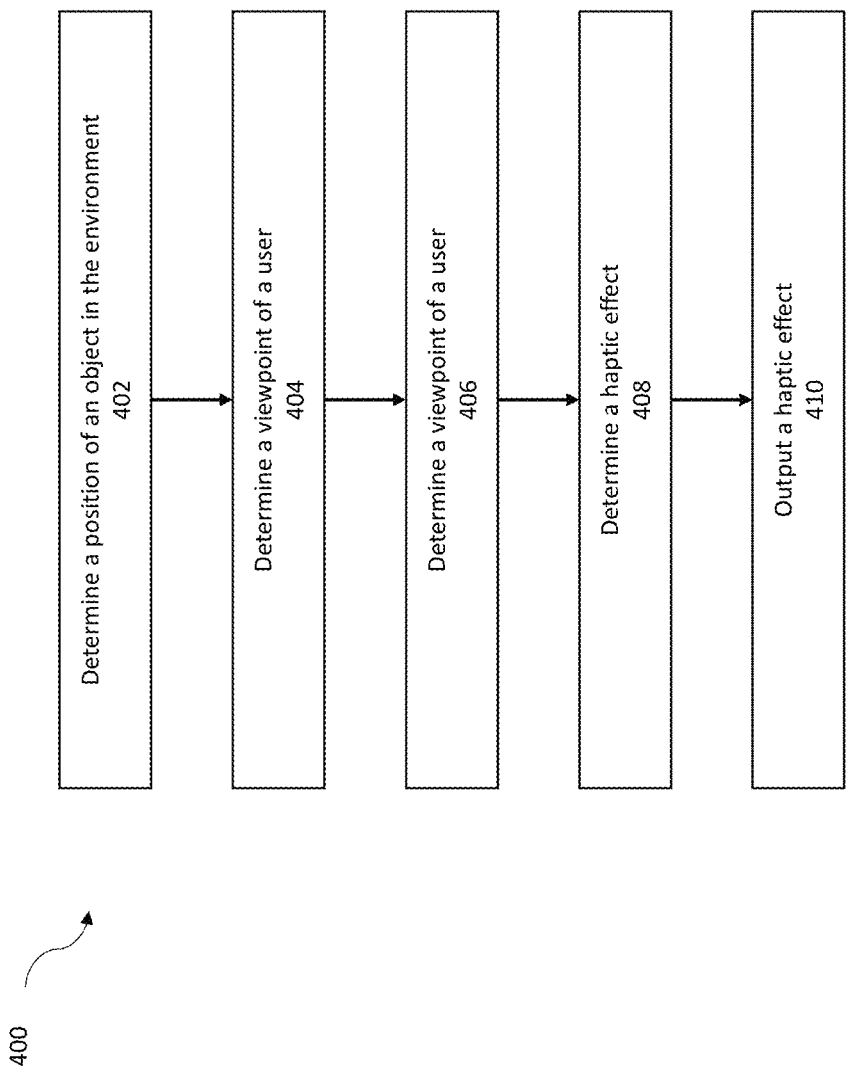
FIG. 41 is a flowchart illustrating a method according to one embodiment.

FIG. 41 is a flowchart illustrating a method 400 according to one embodiment. In the embodiment shown, the system first determines the position of an object in a virtual or augmented environment 402. The system then determines a viewpoint of at least one observer with respect to the object 404. The system next determines a haptic effect to be output based at least in part on the position and the viewpoint 406. And finally, the system then outputs the haptic effect.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments.

Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method comprising:
displaying a first user interface element in a virtual or augmented reality environment, the first user interface element comprising a plurality of layers along a first axis, wherein each of the plurality of layers along the first axis is associated with a first property;
receiving an input signal associated with a first movement of a first object along the first axis; and
identifying the first property associated with the respective layer corresponding to the first movement of the first object, wherein the first property is configured to spawn a second object in the virtual or augmented reality environment.

2. The method of claim 1, further comprising executing the first property by spawning the second object in the virtual or augmented reality environment.

3. The method of claim 1, further comprising executing an action comprising a state change configured to change the virtual or augmented reality environment.

4. The method of claim 1, further comprising displaying a second user interface element associated with an action.

5. The method of claim 4, wherein the second user interface element comprises a button displayed in proximity to the first user interface element.

6. The method of claim 4, wherein the second user interface element comprises a button for activating the first user interface element.

7. The method of claim 1, wherein identifying the first property associated with the respective layer comprises determining that movement of the first object along the first axis has stopped.

8. The method of claim 1, further comprising identifying a second movement of the first object in a second axis and executing an action in response to the second movement in the second axis.

9. The method of claim 8, wherein the second movement of the first object in the second axis comprises a tilt.

10. The method of claim 1, wherein the input signal is a first input signal, and the first user interface element further comprises:
a plurality of layers along a second axis, wherein each of the plurality of layers along the second axis is associated with a second property;
receiving a second input signal associated with a second movement of the first object along the second axis; and
identifying the second property associated with the respective layer corresponding to the second movement of the first object.

11. The method of claim 1, wherein the first user interface element comprises a menu.

12. The method of claim 1, wherein the first or second object comprises a user-controlled indicator.

13. The method of claim 1, further comprising outputting a haptic effect when the first object approaches each of the plurality of layers along the first axis.

14. The method of claim 1, further comprising outputting a haptic effect when the first object is in proximity to each of the plurality of layers along the first axis.

15. A non-transitory computer-readable medium comprising processor-executable program code configured to cause a processor to:
displaying a first user interface element in a virtual or augmented reality environment, the first user interface element comprising a plurality of layers along a first axis, wherein each of the plurality of layers along the first axis is associated with a first property;
receiving an input signal associated with a first movement of a first object along the first axis; and
identifying the first property associated with the respective layer corresponding to the first movement of the first object, wherein the first property is configured to spawn a second object in the virtual or augmented reality environment.

16. The non-transitory computer-readable medium of claim 15, further comprising executing the first property by spawning the second object in the virtual or augmented reality environment.

17. The non-transitory computer-readable medium of claim 15, further comprising executing an action comprising a state change configured to change the virtual or augmented reality environment.

18. The non-transitory computer-readable medium of claim 15, further comprising displaying a second user interface element associated with an action.

19. The non-transitory computer-readable medium of claim 18, wherein the second user interface element comprises a button displayed in proximity to the first user interface element.

20. The non-transitory computer-readable medium of claim 18, wherein the second user interface element comprises a button for activating the first user interface element.

21. The non-transitory computer-readable medium of claim 15, wherein identifying the first property associated with the respective layer comprises determining that movement of the first object along the first axis has stopped.

22. The non-transitory computer-readable medium of claim 15, further comprising identifying a second movement of the first object in a second axis and executing an action in response to the second movement in the second axis.

23. The non-transitory computer-readable medium of claim 15, wherein the input signal is a first input signal, and the first user interface element further comprises:
a plurality of layers along a second axis, wherein each of the plurality of layers along the second axis is associated with a second property;
receiving a second input signal associated with a second movement of the first object along the second axis; and
identifying the second property associated with the respective layer corresponding to the second movement of the first object.

* * * * *